(12) United States Patent
Leduc

(10) Patent No.: US 10,816,693 B2
(45) Date of Patent: Oct. 27, 2020

(54) METHODS, SYSTEMS, APPARATUSES AND DEVICES FOR FACILITATING MOTION ANALYSIS IN A FIELD OF INTEREST

(71) Applicant: Reliance Core Consulting LLC, Alexandria, VA (US)

(72) Inventor: Jean-Pierre Leduc, Clarksburg, MD (US)

(73) Assignee: RELIANCE CORE CONSULTING LLC, Alexandria, VA (US)

( * ) Notice: Subject to any disclaimer, the term of this patent is extended or adjusted under 35 U.S.C. 154(b) by 25 days.

(21) Appl. No.: 16/248,418

(22) Filed: Jan. 15, 2019

(65) Prior Publication Data

US 2019/0154872 A1 May 23, 2019

Related U.S. Application Data

(63) Continuation-in-part of application No. 16/197,725, filed on Nov. 21, 2018, which is a
(Continued)

(51) Int. Cl.
*G01V 8/20* (2006.01)
*H04N 5/247* (2006.01)
(Continued)

(52) U.S. Cl.
CPC ............ *G01V 8/20* (2013.01); *G06N 3/08* (2013.01); *G06T 7/292* (2017.01); *G06T 7/593* (2017.01); *G06T 17/00* (2013.01); *H04N 5/247* (2013.01); *G06T 2207/10016* (2013.01); *G06T 2207/10021* (2013.01); *G06T 2207/10024* (2013.01); *G06T 2207/20081* (2013.01); *G06T 2207/20084* (2013.01); *G06T 2207/30232* (2013.01); *G06T 2207/30241* (2013.01)

(58) Field of Classification Search
CPC .......... G01V 8/20; H04N 5/247; G06T 7/292; G06T 17/00; G06N 3/08
See application file for complete search history.

(56) References Cited

U.S. PATENT DOCUMENTS 4,532,507 A * 7/1985 Edson ...................... G07C 9/33
340/5.22
9,846,805 B2 * 12/2017 Painter ..................... G06T 7/215
(Continued)

*Primary Examiner* — Shawn S An

(57) ABSTRACT

According to some embodiments, a system for performing motion analysis in a field of interest is disclosed. Further, the system may include a plurality of motion sensors configured to generate a plurality of motion data corresponding to at least one motion of at least one object in the field of interest. Further, the system may include a communication device configured for receiving configuration data associated with the field of interest from at least one data source. Further, the system may include a processing device configured for generating a digital model corresponding to the field of interest based on the configuration data using a simulation module and generating one or more of a plurality of motion signatures corresponding to a plurality of predetermined motions and a plurality of object signatures corresponding to a plurality of predetermined objects based on the digital model using the simulation module.

18 Claims, 20 Drawing Sheets

Related U.S. Application Data continuation-in-part of application No. 16/231,004, filed on Dec. 21, 2018.

(60) Provisional application No. 62/617,502, filed on Jan. 15, 2018, provisional application No. 62/589,287, filed on Nov. 21, 2017, provisional application No. 62/609,594, filed on Dec. 22, 2017.

(51) Int. Cl.
*G06T 7/292* (2017.01)
*G06T 17/00* (2006.01)
*G06N 3/08* (2006.01)
*G06T 7/593* (2017.01)

(56) References Cited

U.S. PATENT DOCUMENTS

| | | | | |
|---|---|---|---|---|
| 2004/0239509 A1* | 12/2004 | Kisacanin | ............ | G01S 13/867 340/575 |
| 2005/0169314 A1* | 8/2005 | Beaudoin | ........... | H04N 21/2343 370/480 |
| 2006/0150222 A1* | 7/2006 | McCafferty | ............ | H04N 7/106 725/81 |
| 2006/0229739 A1* | 10/2006 | Morikawa | ............ | G05B 13/027 700/19 |
| 2009/0048518 A1* | 2/2009 | Furman | ................ | A61B 5/0031 600/454 |
| 2011/0255093 A1* | 10/2011 | Chmelik | ................ | G01B 9/023 356/457 |
| 2012/0188344 A1* | 7/2012 | Imai | ....................... | H04N 5/232 348/47 |
| 2013/0078904 A1* | 3/2013 | Yang | .................... | G06F 3/1454 455/3.06 |
| 2013/0114849 A1* | 5/2013 | Pengelly | ............ | G06K 9/00979 382/103 |
| 2014/0169634 A1* | 6/2014 | Prakash | ............ | G06K 9/00791 382/105 |
| 2015/0016712 A1* | 1/2015 | Rhoads | ............ | G06K 9/00208 382/154 |
| 2015/0036883 A1* | 2/2015 | Deri | ................... | G06K 9/00771 382/103 |
| 2015/0108901 A1* | 4/2015 | Greene | .................. | H05B 47/16 315/149 |
| 2015/0219682 A1* | 8/2015 | Lasko | ..................... | A63F 13/71 702/141 |
| 2015/0237325 A1* | 8/2015 | Angot | ................ | A61B 1/00009 348/47 |
| 2015/0278988 A1* | 10/2015 | MacMillan | ........... | G06T 3/0068 348/218.1 |
| 2016/0098646 A1* | 4/2016 | Gomez | ................ | G06N 3/0454 706/12 |
| 2016/0307324 A1* | 10/2016 | Nakada | ................ | G06K 9/6215 |
| 2017/0025000 A1* | 1/2017 | Lagassey | ................ | B64C 37/02 |
| 2017/0122769 A1* | 5/2017 | Martin | ...................... | G01P 7/00 |
| 2017/0201684 A1* | 7/2017 | Kang | ................ | H04N 5/23287 |
| 2017/0213576 A1* | 7/2017 | Nugumanov | ........ | G11B 27/036 |
| 2017/0242714 A1* | 8/2017 | Chen | ....................... | G06F 9/455 |
| 2017/0251035 A1* | 8/2017 | Siminoff | .......... | G08B 13/19671 |
| 2017/0297488 A1* | 10/2017 | Wang | ....................... | B60R 1/00 |
| 2017/0304707 A1* | 10/2017 | Morton | .................... | G09B 5/12 |
| 2018/0041492 A1* | 2/2018 | Jacobs | .................... | H04L 63/08 |
| 2018/0130168 A1* | 5/2018 | Nayshtut | ................. | H04L 63/08 |
| 2018/0357871 A1* | 12/2018 | Siminoff | .......... | G08B 13/19673 |
| 2019/0034734 A1* | 1/2019 | Yen | ........................ | G06N 3/084 |
| 2019/0114804 A1* | 4/2019 | Sundaresan | ............... | G06T 7/74 |
| 2019/0121334 A1* | 4/2019 | Song | .................... | G06N 20/00 |
| 2019/0156496 A1* | 5/2019 | Leduc | .................... | G06T 7/292 |
| 2020/0068686 A1* | 2/2020 | Harrison | ............... | G06T 15/506 |

\* cited by examiner

METHODS, SYSTEMS, APPARATUSES AND DEVICES FOR FACILITATING MOTION ANALYSIS IN A FIELD OF INTEREST

The current application claims a priority to the U.S. Provisional Patent application Ser. No. 62/617,502 filed on Jan. 15, 2018.

The current application is a continuation-in-part (CIP) application of a U.S. non-provisional application Ser. No. 16/197,725 filed on Nov. 21, 2018. The U.S. non-provisional application Ser. No. 16/197,725 claims a priority to a U.S. provisional application Ser. No. 62/589,287 filed on Nov. 21, 2017.

The current application is a continuation-in-part (CIP) application of a U.S. non-provisional application Ser. No. 16/231,004 filed on Dec. 21, 2018. The U.S. non-provisional application Ser. No. 16/231,004 claims a priority to a U.S. provisional application Ser. No. 62/609,594 filed on Dec. 22, 2017. The U.S. non-provisional application Ser. No. 16/231,004 also claims a priority to a U.S. provisional application Ser. No. 62/617,502 filed on Jan. 15, 2018.

TECHNICAL FIELD

Generally, the present disclosure relates to the field of data processing. More specifically, the present disclosure relates to methods, systems, apparatuses and devices for facilitating motion analysis in a field of interest.

BACKGROUND

Motion is one of the most crucial piece of information. Early before achieving any high resolution, nature developed vision for motion detection and control for the critical purpose of survival, defense and hunting.

Motion analysis may be used for motion detection and/or moving target recognition applications. These applications may include motion analysis in sports fields, militarized sites, or even in research laboratories etc.

Further, the drawback of conventional motion analysis systems that may be based on numerous video cameras are multi-fold and the following itemizes the most important disadvantages:

1. At a sensor layer, the trends in constructing video cameras are to move to higher and higher pixel density in order to improve the image resolution. Increasing the resolution diminishes the sensitivity. But sensitivity is the property needed to detect changes of contrast in the observed scene and especially in dim light. The move to high sensitivity leads to using detectors that work each as an independent pixel that count photons. High sensitivity requires to develop large fields of view, a move that diminishes the resolution.

2. At the telecommunication layer, each video camera produces a compressed bit rate of several megabits per second (Mb/s) that has to be transmitted in real time, or stored but not yet analyzed to detect motion. For example, compressing HD video with an original sampling resolution of 1920×1080 pixels using an MPEG4 standard with a constant frame rate of 24, 25 or 30 progressive images per second (image/s) generates bitrates that range from 5,000 to 10,000 Kbit/s. The file-size of the compressed video may range from about 400 MB to 750 MB (Megabytes) after 10 minutes and 6 times those amounts after one hour.

3. At the application layer, all video information still need to be analyzed in real time to unfold the embedded motion.

Therefore, the "camera-everywhere" involves a huge amount of data that needs:

To be transmitted that would overpower the telecommunication network, and,

To be processed by the application layer that would be untraceable or unmanageable in real time for an intelligent system.

Therefore, there is a need for improved methods, systems, apparatuses and devices for facilitating motion analysis in a field of interest that may overcome one or more of the above-mentioned problems and/or limitations.

BRIEF SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some embodiments, a system for performing motion analysis in a field of interest is disclosed. Further, the system may include a plurality of motion sensors configured to be disposed in the field of interest. Further, the plurality of motion sensors may be configured to generate a plurality of motion data corresponding to at least one motion of at least one object in the field of interest. Further, the system may include a communication device configured for receiving configuration data associated with the field of interest from at least one data source. Further, the system may include a processing device configured for generating a digital model corresponding to the field of interest based on the configuration data using a simulation module. Further, the processing device may be configured for generating one or more of a plurality of motion signatures corresponding to a plurality of predetermined motions and a plurality of object signatures corresponding to a plurality of predetermined objects based on the digital model using the simulation module.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
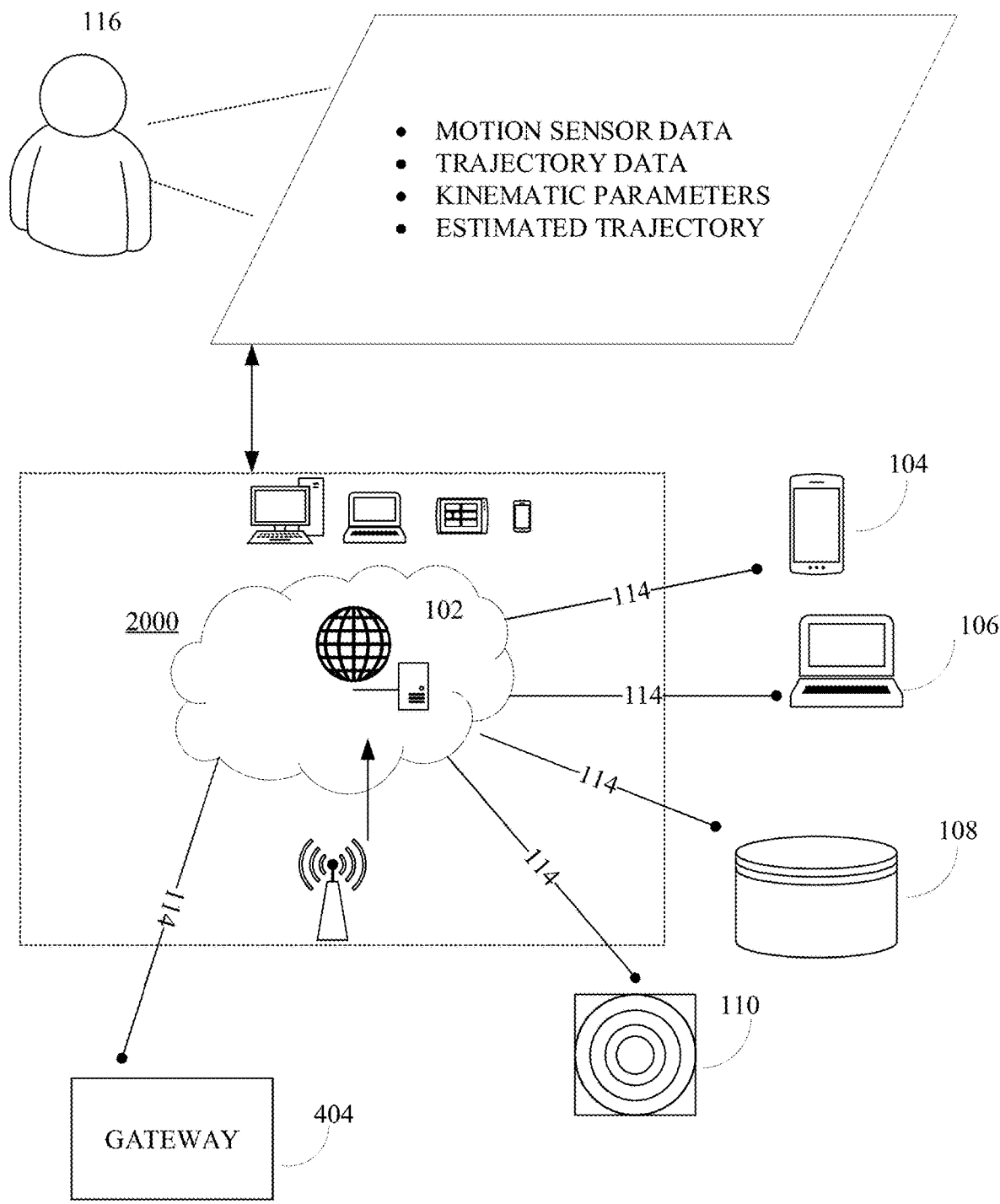
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of motion analysis in a field of interest, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The disclosure describes motion-intelligent systems that may perform motion analysis, supervision and control on delimited field of interest out of the physical world. A field of interest may define a three-dimensional space and time space, referred by acronym "3D+T" to be monitored. Examples of a field of interest may include commercial and business premises, residential, public and administrative buildings, parking garages, transportation stations and undergrounds, airports, private properties/residences, city streets, and battlefield of interests. A field of interest may be categorized into three main varieties namely motion-intelligent buildings (in FIG. 6), cities, and inaccessible grounds (open field of interests in FIG. 7).

Further, motion analysis may include motion detection of moving patterns, motion-oriented classification and selection on the detected moving patterns, estimation of kinematical parameters including velocity, position, scale and orientation, and prediction of the kinematical parameters. Further, motion analysis may include tracking to build trajectories of moving patterns of interest, detection, indication and prediction of abnormalities, incidents, and accidents, and focusing on patterns of interest.

Motion analysis may be performed passively and actively by sensing electromagnetic and/or acoustic waves which physical properties have been transformed by the moving objects. For instance, an operator may have actively spread motion sensors randomly over an entire physical field of interest, and motion sensors may be nodes located at the bottom of a networking system. The networking system can may be decomposed into three major components and described. A set of different sensors may capture motion, provide high resolution information, make precise measurements, tag moving patterns of interest and convert information into data to be transmitted. Further, a tree-structured telecommunication system may relay the data from the sensors to a data sink or gateway connecting to other means of communication. Further, a remote monitoring center may receive the data and perform the motion-intelligent supervision and control. The motion analysis may be performed from digital signals captured from numerous sensors distributed in the field of interest. The sensors may include motion sensors (passive photodetectors) randomly spread in the field of interest to analyze and track motion throughout the field of interest through three spectral bands, namely the visible spectrum for optical imaging, the near-infrared for chemical imaging and the mid-infrared for thermal imaging. Further, the sensors may include video cameras located on key locations or embarked in moving systems such as drones or robots to provide high resolution images and videos for final pattern recognition. Further, the sensors may include Active motion-measurement devices based on ultrasonic, microwave, or laser radars to provide precise measurement of the kinematical parameters for tracking, approach and capture. Further, the sensors may include marking sensors (passive walk-through detectors) standing on key spots as specialized sensors detecting radioactive, chemical and biological sources, and moving metal pieces. Marking sensors also include active devices such as active badges to mark or label some moving patterns as an item of special interest entering in the field of interest, and specifically, to trace the moving patterns in the field of interest. The motion sensors and the network components involved in local telecommunications to routers may be manufactured using innovative nano-technology and Tera-Hertz communications to implement a local Internet of Nano-Things. At the remote monitoring center, raw data may be reconciled and re-ordered in time and space on an updated topographic representation of both the field of interest and the sensor locations originally acquired during the initial training phase. The motion analysis may be performed by a neural network functioning in an adaptive dual control process with two main modes depending on the predictability or the unpredictability of the environment. Further, dual control may proceed with a deep learning process, or with an expert system. Further, the deep learning process may relies on an intelligence learned through training and updating phase from a big data source. The deep learning process may be fast and may refer to empirical way of learning on the field of interest. The expert system is based on the accurate model of the mechanics in the field of interest and the wave capture in the sensors. Further, the expert processing process may be slow and may refer to rational way of learning.

In situations of interest, the dual control may also proceed to a third mode that may lock control on specific patterns of interest. Further, human supervision may also allow a possibility to react and sent remote controlled mobile systems with embarked video-camera like drones or robots on a key location of the field of interest. Under those circumstances, the remote monitoring center would be able to communicate directly with the mobile systems bypassing the network.

Figure 6:
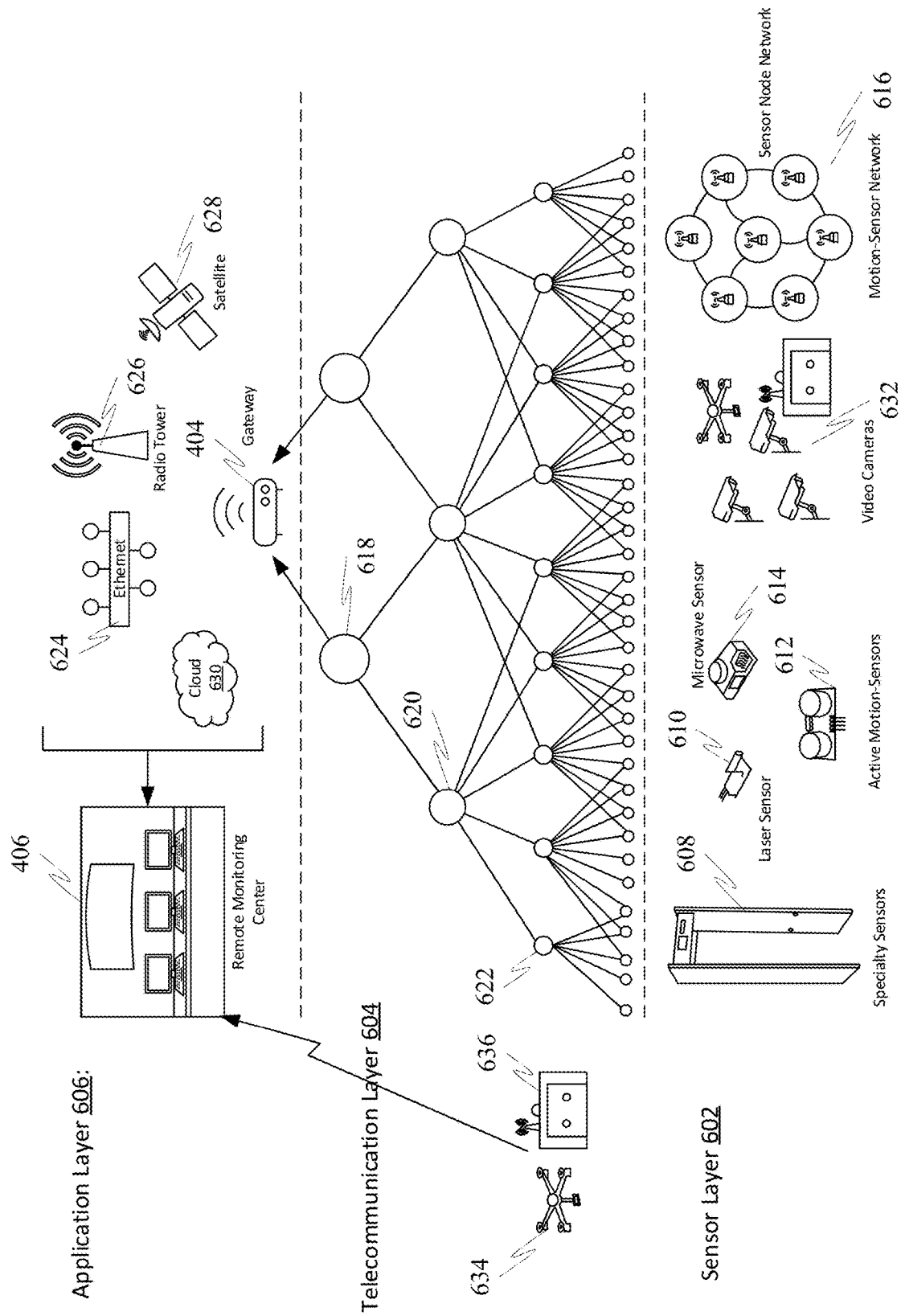
FIG. 6 shows a Motion-Intelligent Field (Indoor/Outdoor Applications), in accordance with some embodiments.

To yield an effective structure description, the motion-intelligent system may be subdivided into three components as presented in FIG. 6, namely the sensor layer (lowest physical layer responsible for the detection and the measurement of kinematical parameters), which may include different type of sensors as described above, the telecommunication layer, which may transmit the collected information to a gateway or a data sink, and may include upper physical layer of the detectors, the components responsible for carrier generation, modulation and frequency selection, the data link layer, and the network layer, the transport layer (the Internet, radio or satellite communications) and the application layer (the Cloud, workstations specialized in Artificial Intelligence especially deep learning neural networks).

To provide some context on the invention, motion-intelligent systems mimic the work performed by the human sensory systems spread on the skin. Adapted for the present application, the sensory system spans the entire physical field of interest. Motion-intelligent system applications perform a motion analysis, supervision and control that fall in two modes of operation which are namely passive or active.

In passive schemes, motion analysis may be performed like a human perception in the cortex that may perform as a supervisor of motion. Passive sensors may capture propagating waves that may be emitted from an external source, usually in the visible spectrum, and may be reflected by moving targets. Sensors may also capture waves that may be produced by the moving object itself, for instance if the object is thermally warm or hot. An example of such a sensor is a thermal infrared camera. In active schemes, the motion analysis may derive accurate measurements that may enable fine control and action on the environment. Active sensors may produce analyzing waves (acoustic, microwaves) in the field of interest, collect the reflected waves, compute relative velocities of the target from Doppler shift, and perform echolocation through phase difference and time delay.

In an active scheme, motion analysis may proceed up to a final locked control on the pattern of interest. The analysis may proceed through three successive phases including search phase proceeding with a large spectrum recognition, approach selecting a target or patterns of interest, and terminal phase capturing or recognizing the pattern.

Further, intelligent-motion analysis and control based on a sensor network to be developed may work with biological sensory systems. The sensory system may transduce signals in form of wave energy originating from the physical world where motion may takes place into information. Only useful information is able to reach the brain through a gateway where the information is analyzed by the cortex. Motion analysis is performed by three different types of biological systems that perform motion analysis, supervision and control. The biological systems, including auditory systems, visual systems, and cutaneous sensory systems provide perfect analogy to intelligent-motion control system to be implemented. Further, each biological system is composed of three main components including sensors located at periphery of the body in the skin, nerves that work as a bundle or a network of "telephone" lines and transmit to the brain the useful information collected and filtered by the sensors, and, intelligent areas in the cerebral cortex that have learned and acquired at an initial age both the topographic mapping of the body and the way how to generate a conscious perception of motion.

Auditory systems rely on ears as sensors and bring forth the opportunity to implement sonars and echolocation as rooted in bats and dolphins. The motion analysis in the ears implements a time-frequency analysis which is based on a continuous wavelet transform technique.

Visual systems rely on eyes as sensors. In human visual system, transmission network is based on a bundle of nerves that end up on two gateways in the brain located in the lateral geniculate nuclei. From the geniculate nuclei, the information is spread and analyzed in the primary visual cortex. In the human eye, the information is split into two components. A spot in the retina, called the fovea, creates high-resolution images from a high-density photoreceptor grid that enables visual recognition and classification. At the periphery of the retina around the fovea, a network of sparse photoreceptors is involved in motion detection and tracking.

Cutaneous sensory systems rely on sensors, for example mechanoreceptors, non-uniformly spread over the entire skin. Further, some areas have higher sensor density. The transmission network concentrate and bundle in the spinal cord. The sensory pathway synapses at the brain, proceeds to a gateway located in the thalamus. From the thalamus, the information is spread into the brain to reach the cerebral cortex at the perfect location for conscious perception on a body map that was originally learned.

Two competitive methodologies can be used for a "3D+T" intelligent motion analysis, supervision and control of a field of interest. Motion analysis performed may be from a set of numerous video cameras distributed in the field of interest, also known as "camera-everywhere" approach. Further, motion analysis may be performed through motion sensors scattered in the field of interest and a restricted number of video cameras located at selected spots. However, drawback of systems based on numerous video cameras are multi-fold. For instance, trends in constructing video cameras may include moving to higher pixel density in order to improve image resolution. Increasing the resolution diminishes the sensitivity, which is needed to detect changes of contrast in an observed scene especially in dim light. Move to high sensitivity may lead to use of detectors that may work each as independent pixel that may count photons. High sensitivity may require development of large field of interests of view, which may diminishes resolution.

At telecommunication layer, each video camera may produces a compressed bit rate of several Megabits per second (Mb/s) that may need to be transmitted in real time, or stored but not yet analyzed to detect motion. For example, compressing HD video with original sampling resolution of 1920×1080 pixels using a MPEG4 standard with a constant frame rate of 24, 25 or 30 progressive images per second (image/s) may generate bitrates that range from 5,000 to 10,000 Kbit/s. File-size of the compressed video may range from about 400 MB to 750 MB (Mega Bytes) after 10 minutes and 6 times those amounts after one hour. Further, at application layer, all video information may need to be analyzed in real time to unfold the embedded motion. Therefore, the "camera-everywhere" involves a huge amount of data required to be transmitted, which may overpower the telecommunication network, and, to be processed by the application layer that may be untraceable or unmanageable in real time for an intelligent system.

To compare both approaches, consider a motion-detector composed of 8×8=64 sensors, where each sensor may generate 12-bit samples. At a change of contrast, information may be estimated at maximum of about 1 Kbit encoded data per second over a period when intensity varies. Accordingly, the local system may have to involve 10,000 sensors permanently to reach a level of a video-camera data rate.

As a matter of comparison with nature, evolution has chosen to develop a network of sensory systems that are composed of different specialized motion sensors spread at the body periphery on the skin. The sensor density is variable and locally adapted to the necessity or the need. A network of nerves communicates the useful information to the cortex through a telephone line system bundled in the spine. The useful information reaches the cortex after passing through a gateway that relays the signal to the centers of interest. In the cortex, the transmitted signal produces a perception with intensity and localization on the topographic map of the acquired body representation.

Motion detection is performed in the eyes at the periphery of the retina through a sparse system of photodetectors. The visual system orients the eyes and the fovea to the sensitized skin spot or towards the detected motion to get a high-resolute image of the pattern of concern. The human detection system is based on multiple specialized sensor networks, one integrated eye, and a multi-brain where specialized and optimal detection relies on networks of scattered sensors, specialized highly resolution images relies on one single visual system, and a specialized pattern analysis and recognition supervision and control relies on the cortex which performs as a multi-brain.

The human detection system is more efficient as the human detection system minimizes a quantity of information to be transmitted and to be handled by the cortex, and, the human detection system relies on different contributing functions each optimally designed for a purpose. Restated in other words, design of a human body with eyes everywhere would lead to an inefficient and intractable system which would request a bundle of high data rate transmission line and would flood the cortex of information. In the cortex, each source would request its own specific processing system to extract the useful content.

The motion-intelligent system mimics the functioning of a generalized central and peripheral nervous system where each part may perform work with optimum efficiency. The motion information may be captured by a mix of three categories of sensory systems each specialized for a known purpose, namely cutaneous sensory system (the motion sensor network), the visual system (the video-cameras) and the auditory system (the echolocation and radars). Network of communication may transport the information and reach an intelligent cortex through routers and one gateway. An artificial intelligence which may have originally acquired the topography of the field of interest may perform motion analysis. One analysis may be performed experimentally bottom-up and a second analysis may be performed rationalistically top-down on-field of interest training and updating as a Q-learning system generating fast unconscious perception of motion, and on computations performed by an expert system based on actual physics of all the phenomena taking place in the field of interest (mechanics, waves and sensors) generating a slow conscious perception of motion. Moreover, the theoretical model with mechanics and wavelets may be universal and may apply for each sensory system for detection, prediction and tracking. Further, the motion-intelligent system may detect any motion, predict a path, target and insulate any moving patterns up to capture. The motion-intelligent system may be proactive on predicting incidents and accidents, which is where big data streams and data analytics may reach optimal performances. Further, the motion-intelligent system may be scalable and fault resistant. A density of sensors, volume for information storage and the computing power may be each be individually increased. Existence of a universal model originating from physics may implies convergence to one single existing optimal solution for each field of interest configuration. The resulting system may have a capability to be stronger than any human or group of humans in terms of supervision and control and in term of preventing intrusions, providing security. Further, the motion-intelligent system uses photo detection based motion sensors that may work with synergy in three adjacent spectral bandwidths, namely visible light, near infrared and mid-infrared. Visible light may enable detection and the recognition of patterns. Near infrared may enable the detection of moving or static clouds of chemicals of interest. Mid infrared may enable detection and the recognition of thermal activity, gunshots, fire and explosions. Further, the motion-intelligent system may activate, with human supervision, another layer of communication by sending a robot or a drone to a site of interest. The robot or the drone may be able to communicate directly to the sensors or to a local sub-router on the field of interest and directly to the remote monitoring center bypassing the entire network of communication for fast action purpose. Further, the motion-intelligent system may be energy efficient. Sensing and measurement architecture may use a minimal level of energy and may use state-of-the-art low-power sensing, amplification, and telecommunication technologies. The motion-intelligent system may be discretely connected to a power source or have advanced capabilities to harvest energy either inside buildings collected from ambient energy like energy radiated by electromagnetic waves or outside buildings from energy collected by small solar panels. Sensors may be environmentally friendly. Further, the motion-intelligent system may offer a broad range of measurements and short term and long-term statistics that may just limited by human imagination and that may be increasing following progression of the technology especially the computing power. Further, the motion-intelligent system may offer ease of installation. Compared to existing systems like camera, walk-through detector, the motion-intelligent system may need minimal installation effort. For each measurement point, the motion-intelligent system may require to install wireless motion sensors on existing structures. Further, the motion-intelligent system may offer endurance as the sensors may not require batteries. The motion-intelligent system may need maintenance after installation related to training evaluation and situation updates that may not request operations to be stopped. The motion-intelligent system may have a long-life expectancy. Further, the motion-intelligent system may be almost invisible to the human eye making difficult to be dismantled. Therefore, the motion-intelligent system may not be vulnerable like video-cameras, walk-through detector, and existing occupancy detectors.

Further, the motion-intelligent system may merge all existing motion sensors into a unique network that may connect to one single artificial intelligence. Further, the motion-intelligent system may use specific sensors that may each be specialized in a task making the motion-intelligent system efficient and effective in terms of the information that is transported over the network. Motion sensors may be passive and ubiquitous sensors based on photodetection conveying high sensitivity to changes of contrast in different useful spectral band but with less resolution. Motion sensors may lead to a three-dimensional perception of motion which may depend on density and location in the field of interest. Further, video-cameras may be passive and localized sensors based on photodetection conveying high resolution image with less sensitivity. Video-cameras may lead to a three-dimensional perception of motion. Further, radar-sonar sensors may be based on active and localized sensors that may provide ultimately precise measurements of kinematical parameters along with some echolocation. Further, the motion-intelligent system may be universal and adaptive to any field of interest by mix of sensors that may be managed.

Further, the motion-intelligent system may be scalable and fault-tolerant. Further, the motion-intelligent system may be overall extendable/stretchable or contractible/shrinkable by adding or subtracting modules or subfield of interests at will. Further, the motion-intelligent system may be locally adjustable in density where sensors may be added or removed without interrupting work of global functions. Further, the motion-intelligent system may allow motion to be detected everywhere in the field of interest in real time by the use of motion-specific motion sensors. The sensors may be activated for transmission when motion may be detected. Compared to existing motion sensors which may be occupancy sensors, the motion sensors may provide enough detailed information for global recognition and kinematical parameter estimation. Further, the motion-intelligent system may be optimal relatively to installed power which may be determined by installed technologies for detection, transmission and computer power. Implementations may follow technology advances converging to an optimal solution. Being based on an artificial intelligence and ubiquitous sensors, the motion-intelligent system may leads to surveillance, security solutions that may be above human capabilities. As an example, deep learning system may defeat world-wide champions on most difficult games, the GO-game.

Further, the disclosure describes design of a motion-intelligent system that may perform motion analysis, supervision and control from digital signal captured from a network of motion sensors scattered over a physical field of interest and from multiple video cameras where "3D+T" motion analysis may be performed. Motion analysis may include motion detection, motion-based classification and recognition of moving patterns, and estimation, prediction and tracking of kinematical parameters to build trajectories. Recognition and classification of moving pattern may include a selection through scale and orientation. Shape recognition may involve size, volume and shape. Orientation recognition may involve perception of main alignment like horizontal, vertical, degree of inclination. Further, kinematical parameters may be defined as spatial and temporal position and velocity or speed. Further, velocity may be vector with three components and the speed may be defined as the magnitude of the velocity vector. The contribution of video cameras may be to provide the motion-intelligent system with high-resolution images at locations that may be crucial for recognition and classification of moving patterns. Further, the contribution of the motion sensor network may be to bring motion detection, estimation and tracking capabilities. For instance, if an operator has actively spread motion sensors randomly over an entire physical field of interest, the entire motion-intelligent system may be described following a bottom-up approach and decomposed into three major components as introduced earlier in FIG. 6. Those components are as follows:

A set of different sensors captures motion, measurement and moving-image information, converts them into data to be transmitted.

A tree-structured telecommunication system relays the data from the sensors to a data sink.

A motion-intelligent supervising system receives the data.

The motion sensors are nodes located at the bottom of the entire networking system. The following proceeds to a detailed bottom-up description of the system.

The sensor nodes of the present invention implement all the functions of the physical layer of the system. Those functions are responsible for signal detection, analog-to-digital conversion, entropy coding of the useful information into data to be transmitted with potential error correcting codes and encryption. The node uses an appropriate carrier frequency and an efficient modulation technique.

The number of motion sensor nodes in the network is supposed to be very high. A network may count a few hundred thousand to millions of motion sensor nodes. Two important properties and factor driving the design of motion-intelligent sensor networks shall be fault tolerance and scalability. Those characteristics shall serve as guideline to design a protocol of communications inside the network.

Fault tolerance supposes that some sensor may fail to work momentarily by lack of power of permanently by enduring physical damage. The failure of sensor nodes shall not affect the overall task of the sensor network. By definition, fault tolerance is the ability to maintain sensor network functionalities without any interruption due to sensor node failures. The survival probability of a node, meaning the probability not to have a failure, within a time interval (0, t) is given in whole generality by a Poisson process $$P_k = e^{-\lambda t} \qquad (1)$$

where $\lambda_k$ is the failure arrival rate for a sensor node k and t is the time period. Failure can also occur by cluster when a router located at a network node is failing or by any other means of subfield of interest destruction.

The scalability is relating to the fact that density of sensor is scalable and can vary from region to region from a few sensors nodes in some areas to a few hundred of sensor nodes in some other areas. The density can be calculated following the formula $$\mu(R) = (N\pi R^2)/A \qquad (2)$$

where N is the number of scattered sensor nodes in area A, R is the radio transmission range.

The telecommunication network of the present invention has a hierarchical structure bottom up on the physical layer connecting sensors to sub-routers, a hierarchy of sub routers connects to routers, and the layer of routers connect to one gateway at the top of the tree structure. The structured telecommunication network implements the data link layer and the network layer of the system. The data link layer is responsible to establish the communication links for the data transfer following an infrastructure of multi-hop wireless communications, to ensure reliable point-to-point or point-to-multipoint communications, to multiplex or aggregate the data collected from the sensors, to effectively share the telecommunication resources on the basis time, energy and frequency. The network layer is responsible to aggregate all the data potentially using additional intermediate nodes as relays and to eventually route the total information to a data sink (the gateway) located at the periphery outside the sensor field of interest. The architecture of this telecommunication network shall adapt to the specific structure of the field of interest and its division into subfield of interests. The physical field of interest can be decomposed or divided into a hierarchy of subfield of interests. Each subfield of interest corresponds to a specific area or section of the field of interest with its own properties, characteristics of interest. Each subfield of interest is controlled by one main router.

Since a subfield of interest can still be divided into smaller areas, each router can control a set of sub-routers. Each router or sub-router has the ability to perform networking functions that are more complicated than those performed by the detector. Routers can be made of different technology, size and radio communication capabilities. All routers eventually connect to one gateway which connects the entire system to a remote monitoring center through another network (Internet, satellite, radio). The Internet or other built-up external networks constitute the transport layer that connects the sink to the remote monitoring center.

The motion-intelligent supervising system located at a remote monitoring center manages the functionalities of the system. The remote monitoring center implements the application layer of the system. The incoming data provided by the gateways is processed in four major steps as follows:
1. The incoming data is reconciled and reconstructed in "3D+T" on the acquired topography of the field of interest.
2. A deep learning artificial neural network supervised by an expert system implements the motion analysis of detection, recognition and classification of moving pattern including abnormalities, incidents, and accidents.
3. A human supervision follows through to interpret all abnormal events and give more insight to the system. The supervisor can induce a top-down control forcing the system to up-date the knowledge of the environment, to activate additional sensors through routers, to involve video cameras moving with robots or drones, to focalize and perform a locked control for pattern recognition, measurement or capture.
4. A deep learning artificial neural network supervised by an expert system performs additional prediction on the kinematical parameters, data analytics, and trajectory construction.
5. All data are recorded and the systems can produce, on demand in real time or delayed, all sorts of statistics performed on different terms varying from real time, short terms hourly and daily to long terms monthly and yearly.

The motion-intelligent system is based on a deep learning neural network. The deep learning system needs to be initially trained and evaluated. It also requests to be updated when changes occur in the environment. An adaptive dual control enables that the Q-learning function take actions from different sources as follows:
1. The deep leaning estimation that is trained and updated to acquire the statistics of the environment, has learned and updated its capability of detection, recognition and classification, measurement and tracking.
2. The expert system computations based on both the actual model of motion mechanics and the local topography of the system.
3. The precise measurements performed by active sensors in a locked mode.
4. The supervisor decision.

At the remote monitoring center, the data originating from the gateway are analyzed for detection, recognition and classification are presented in real time to the supervisors. The supervisors have the possibility to select moving patterns of interest to be tracked and captured by the video cameras. The system classifies all detected motions, classified them by scale, shape and any other criteria, performs pattern recognition from the cameras, estimate the trajectories from the data collected by the sensor system as far as it is feasible by a real-time processing. All collected data are recorded to enable further off-line analyses and to perform statistics.

Figure 9:
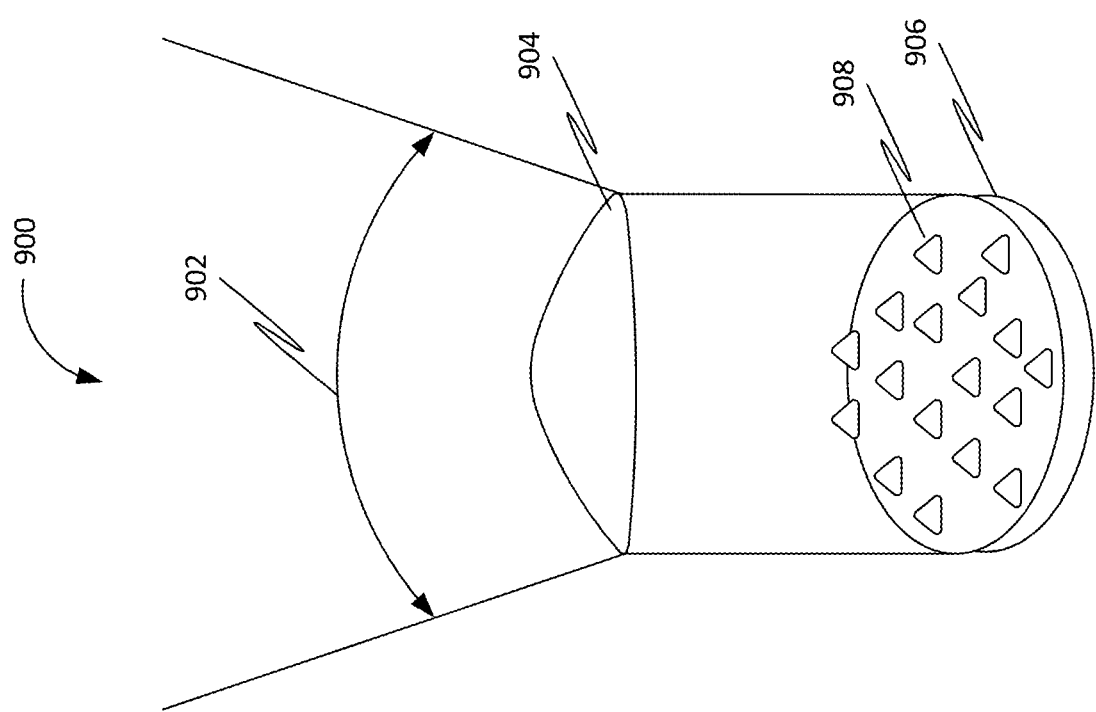
FIG. 9 shows a Photodetector Sample, in accordance with some embodiments.

Once activated, each motion sensor communicates with a router wirelessly. Each motion sensor encodes and transmits the innovative information of the changes of contrast captured from the photodetector array at a pace requested by the environment changes. The transmitted data are composed of sampled detector measurements in term of intensity and position entropy encoded for transmission, of time stamps, and sensor identification. In a usual setting, motion sensors are fixed on the surfaces of construction buildings such as walls and ceilings. The motion sensors capture moving light by photodetection. FIG. 9 shows the motion sensor network. In addition to the motion sensors, some other sensors shall or can be installed in the field of interest. These additional sensors can be categorized as follows in a usual application:
1. A set of video cameras.
2. A set of passive sensors for specific detection and tagging.
3. A set of active sensors for precise motion measurements.

On the field of interest, a set of video cameras can be deployed on the field of interest at key spots to catch high resolution images and videos. All video cameras may transmit the video signals wirelessly through their related routers to reach the gateway which acts as the data sink. At the data sink, the information is transferred through the Internet or another type of network or communications (like satellite) to the remote monitoring center. Additional passive sensors can be deployed over the field of interest in limited number in the field of interest to detect critical information of interest like sounds and acoustics and moving patterns carrying radioactive sources, metal/weapon, or dangerous chemical. The detection may enable the system to label or mark the moving patterns to trace its motion path, to determine the location of entrance in the field of interest, to track position and velocity, and eventually, to allow recognition or capture. Additional active sensors may be deployed based on the use of ultrasounds, microwaves and lasers to perform complementary precise measurements of position and velocity as radars or echolocation as sonars.

At the remote monitoring center, the raw incoming data provided by the gateways is processed in three major steps as follows:
1. The first step consists in a data reconciliation. Raw data are reconciled and re-ordered by time and space. The algorithm proceeds with a first stage of analysis which performs motion detection and estimation performed from the sensors that are active on the field of interest and with pattern classification and recognition from video camera.
2. The system allows to receive human intervention at this stage to give the ability to focus on events of interest.
3. The second step of analysis move further in the motion analysis with motion prediction and trajectory estimation.

The three steps are reviewed with more details in the sequel.

Regarding the present invention's Data Reconciliation and Inverse Problem, the first step consists in a data reconciliation to reconstruct the field of interest in "3D+" by fusing all the data originating from all types of sensors and the video camera along with other data describing the topography of the field of interest. This stage involves a process called inverse problem to detect and estimate motion parameters of interest from the data produced by the sensor network followed by a process of pattern recognition and motion-based classification. The pattern recognition can be refined and/or completed from the data produced by the video cameras. The first step involves a motion analysis performed by a deep learning neural network and an expert system. The deep learning neural network works and proceeds from the experience acquired during the training and updates which is a bottom-up approach. The expert system works and proceeds from the accurate models derived from the physics of mechanics and waves which is a top-down approach. The expert system operates in parallel to the neural network to implement an accurate model of motion as it takes place in the field of interest taking into account the model of sensors and of the field of interest topography. In this framework, the motion detection and the estimations performed by the neural network are supervised, controlled and potentially adjusted by the expert system. The deep learning neural network may proceed further to detect, recognize and characterize incidents, accidents, abnormalities of all kinds (behavioral, intrusion, fire, shots, explosions, etc.).

The deep learning neural network along with the expert system are able to analyze the captured signals according to different motion parameters of interest. These motion parameters are defined as follows from different spatio-temporal transformations. The algorithm incorporates the following transformation parameters:
1. Spatial and temporal translations, with respective parameters denoted by $b \in R^3$ and $\tau \in R$, provide the spatial and temporal location.
2. Spatial rotation, with the parameter denoted $yr \in SO(3)$, the matrix of rotation in three-dimensions, provides the orientation.
3. Spatial dilation, with non-zero positive parameter $\alpha \in \mathbb{R}_*^+$, provides the scale.
4. Velocity transformation with parameter $v \in R^3$.

At this stage, a human supervision may be required to provide further interpretation of some scenes. The human intervention further works to provide a feedback on the system of video cameras to focus on areas of interest. At a most sophisticated level, the human intervention can use robots or drone to focus some camera on the site of interest. A feedback on the sensor network can also be activated by requesting that sub-routers activate more sensors in the area of interest or in areas where the inverse problem may require to be enhanced with a higher sampling density. Such enhancement may be necessary to provide existing, unique and stable solutions for the current analysis under process.

The motion analysis is performed in two fundamental modes:
1. The use of an overall human supervision.
2. The use of a neural network implementing a deep learning system working as a dual control.

The later mode enables to take decisions that are based on a Q-learning function. The Q-learning function further relies on an expert system taking rational actions, on a trained system taking empiric actions and on locked systems taking precise measurements.

The second step involves a motion analysis performed by a deep learning neural network in forms of a dual control system that predicts, tracks and constructs trajectories of interest. The process compares two or more inputs and selects the optimal action to be taken by the Q-learning function. The first input is provided by an expert system like a consciously calculated action (the rational action). The expert system computes the kinematical parameters from exact models that rely on the theoretical mechanics as it takes place on the field of interest and is captures by the sensors. The second input is the trained component which can be very fast since fully adapted like an unconscious nervous reflex (the empiric action)). It is produced by a neuro-dynamic programming algorithm following a statistical model learned by the system at from the initial and later trainings. At this stage, additional inputs may also be made accessible that originate from additional active motion sensors. Those sensors can be based on sonar or radar techniques (acoustics, microwaves or lasers) that perform accurate measurements on the field of interest (the locked action).

In the inverse problem, detection and motion analysis are solved by a dual control process functioning on a deep learning neural network and an expert system. The way a dual control implements an adaptive optimal control is pictured in FIG. 17. On situation of interest, the algorithm can freeze on specific patterns. Depending on the predictability or the unpredictability of the environment, the algorithm can make decisions based on two or more available chains of command.

Periods where the environment is predictable correspond to situations that have been learned during the training. On predictable situations, the deep learning algorithm can work as a stand-alone process that takes actions that rely to its training, meaning the training originally received at the initiation of the system or the latest training update. During the training periods, the weights or the hyper-parameters of the neural network were computed and adjusted for optimal motion analysis.

On situations where the environment deviates from the acquired statistics and become unpredictable, the deep learning can take actions that refer to an exact model. The so-called expert system performs the optimal motion analysis but at a lower speed. The deep learning system needs to be retrained or updated to the new environment statistics.

On special situations where the neural network can rely on additional accurate motion measurements made by an active system (like Doppler measurements through ultrasonic, microwave or laser systems), the supervisor can freeze the control on the measurements performed by the active system. Applications of a locked control can also be implemented as the capture by a robot of a pattern moving in the field of interest. The dual control system is sketched in FIG. 17.

The Q-learning function of the deep learning algorithm allows that action be selected from different sources. In this application, an adaptive process is implemented in the actions to be taken can be determined following two control patterns which are:
1. A dual control.
2. A locked control.

The dual control differentiates between situations that are predictable to situations that are unpredictable. In a predictable environment where the model statistics are unchanged and correspond to the last training update, the action to be taken may follow and rely on the neural network supervised by the expert system. In situations where the model statistics may have or have changed, the environment becomes unpredictable. Exercising caution and learning become the prevailing rules. The determination of the optimal action to be taken may be changed by the supervisor in three different ways as follows:
1. Follow the action computed by the expert system.
2. Explore the new environment to learn.
3. Follow the action computed from another source of measurements.

The locked control corresponds to a possibility given to the supervisor to freeze on the system on a given target of interest. This option is especially useful and efficient where active motion estimation is performed through precise measurements using ultrasonic or laser systems and can be entered as selected action.

FIG. 1 is an illustration of an online platform 100 consistent with various embodiments of the present disclosure. By way of non-limiting example, the online platform 100 to facilitate motion analysis in a field of interest may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and sensors 110 over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web based software application or browser. The web based software application may be embodied as, for example, but not be limited to, a website, a web application, a desktop application, and a mobile application compatible with a computing device X00.

Figure 2:
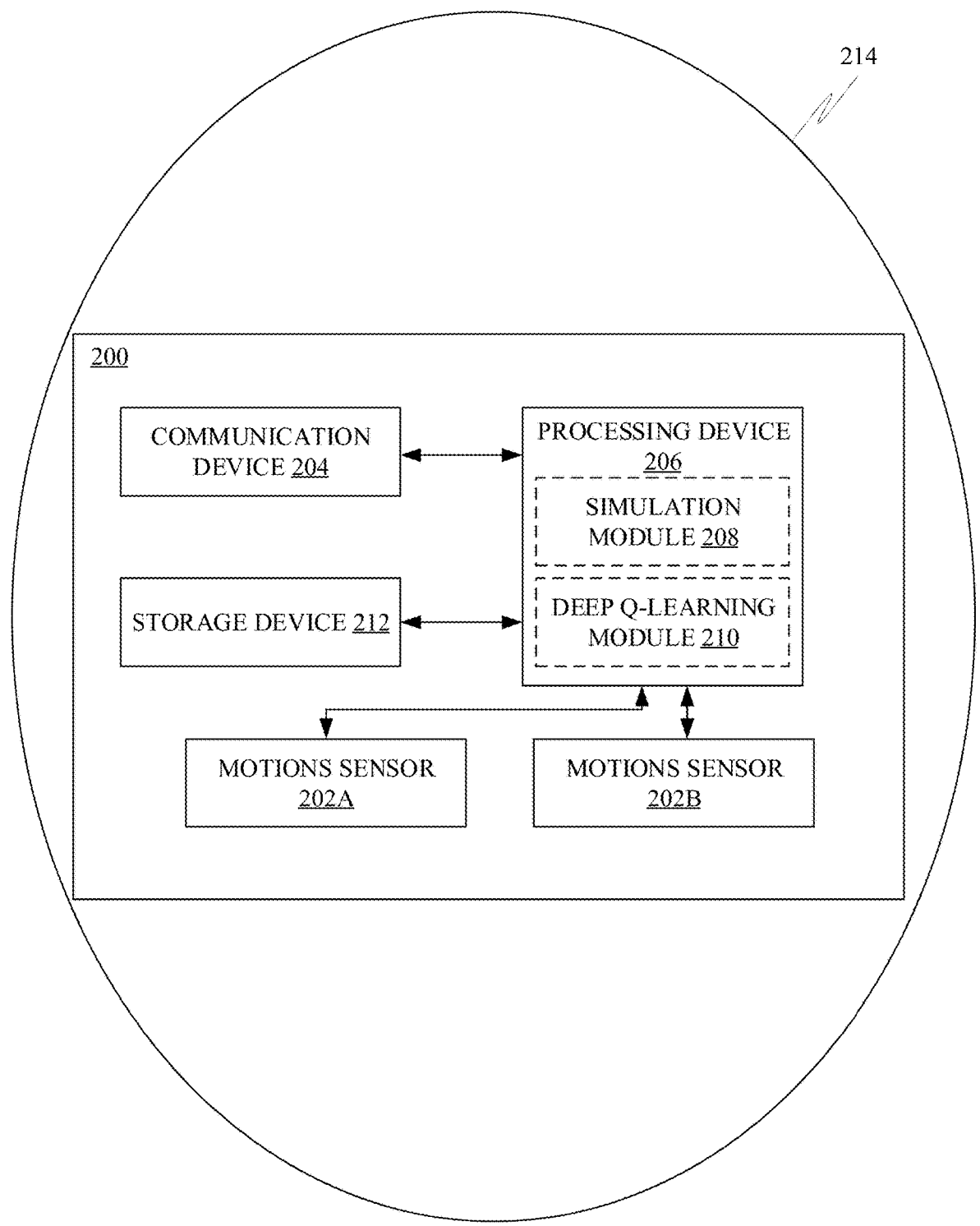
FIG. 2 shows a system for performing motion analysis in a field of interest, in accordance with some embodiments.

FIG. 2 shows a system 200 for performing motion analysis in a field of interest 214. Further, the system 200 may include a plurality of motion sensors 202A-B (such as motion sensor 202A and 202B) configured to be disposed in the field of interest 214. Further, the plurality of motion sensors 202A-B may be configured to generate a plurality of motion data corresponding to at least one motion of at least one object in the field of interest 214. Further, the system 200 may include a communication device 204 configured for receiving configuration data associated with the field of interest 214 from at least one data source. Further, the system 200 may include a processing device 206 configured for generating a digital model corresponding to the field of interest 214 based on the configuration data using a simulation module 208. For instance, in some embodiments, the generating may include calibrating the digital model based on the configuration data. Further, the processing device 206 may be configured for generating one or more of a plurality of motion signatures corresponding to a plurality of predetermined motions and a plurality of object signatures corresponding to a plurality of predetermined objects based on the digital model using the simulation module 208.

Further, the processing device 206 may be configured for performing training of a deep Q-learning module 210 based on one or more of the plurality of motion signatures and the plurality of object signatures. Further, the processing device 206 may be configured for performing a first analysis of the plurality of motion data based on the deep Q-learning module 210. Further, the processing device 206 may be configured for generating at least one trajectory data corresponding to at least one trajectory associated with the at least one object based on the first analysis using the deep Q-learning module 210. Further, the system 200 may include a storage device 212 configured for storing the digital model and one or more of the plurality of motion signatures and the plurality of object signatures.

Further, in some embodiments, the system 200 may include a presentation device configured to present the digital model. Further, in some embodiments, the presentation device may include a display device. Further, in some embodiments, the presentation device may include a touchscreen display. Further, in some embodiments, the presentation device may include a sound reproduction device.

Further, in some embodiments, the digital model may include a visual representation of the field of interest. Further, in some embodiments, the digital model may include a three-dimensional visual representation of the field of interest. Further, in some embodiments, the digital model may include at least one digital representation of at least one of the plurality of motion sensors, at least one object in the field of interest, a plurality of light sources, a plurality of active sources, a plurality of video cameras, the at least one gateway and a topography of the field of interest.

Further, in some embodiments, the configuration data may include one or more of at least one motion sensor characteristic, at least one object characteristic, at least one light source characteristic, at least one active source characteristic, at least one gateway characteristic and at least one field characteristic.

Further, in some embodiments, the digital model may include a motion sensor model associated with a motion sensor (such as the motion sensor 202A) of the plurality of motion sensors 202A-B, an object model associated with an object of the at least one object, a light source model associated with a light source of the plurality of light sources, an active source model associated with an active source of the plurality of active sources, a video camera model associated with a video camera of the plurality of video cameras, a gateway model associated with a gateway of the at least one gateway, a field of interest model associated with the field of interest 214 and a remote monitoring center model associated with a remote monitoring center.

Further, in some embodiments, the object model may include at least one object characteristic of the object. Further, in some embodiments, the at least one object characteristic may include a category of the object, a physical dimension of the object, a position of the object, an orientation of the object, a motion of the object, a visual characteristic of the object, a shape of the object, a color of the object, a texture of the object, a weight of the object and a priori behavior of the object.

Further, in some embodiments, the active source model may include at least one active source characteristic of the active source. Further, in some embodiments, the at least one source characteristic may include at least one of a type of the active source, a position of the active source, an orientation of the active source, an intensity of the source waves, a frequency of the source waves, a duty cycle of the active source and a radiation pattern of the active source.

Further, in some embodiments, the gateway model may include at least one gateway characteristic of the gateway. Further, in some embodiments, the field of interest model may include at least one field characteristic of the field of interest.

Further, in some embodiments, the processing device 206 may be configured for analyzing the at least one trajectory data based on at least one predetermined rule. Further, the processing device 206 may be configured for identifying at least one event of interest based on the analyzing of the at least one trajectory data.

Further, in some embodiments, performing training of the deep Q-learning module 210 may include generating the at least one predetermined rule.

Further, in some embodiments, the processing device 206 may be configured for activating at least one tracker based on identifying of the at least one event. Further, the at least one tracker may be configured for controlling at least one operational state of the plurality of motion sensors 202A-B in order to track the at least one object associated with the at least one event of interest.

In some embodiments, the digital model may include a three-dimensional visual representation of the field of interest 214. Further, the system 200 may include a display device configured for displaying the three-dimensional visual representation.

In some embodiments, the object model may include a plurality of object models corresponding to a plurality of predetermined objects. Further, a plurality of object signatures may correspond to the plurality of predetermined objects. Further, the plurality of object signatures may include a plurality of motion sensor data associated with the plurality of motion sensors 202A-B. Further, the plurality of object models may be determined based on one or more of systematically varying the at least one object characteristic and a strategic input received from an input device operated by a human expert.

In some embodiments, the motion of the object model may include a plurality of predetermined motions. Further, a plurality of motion signatures may correspond to the plurality of predetermined motions. Further, the plurality of motion signatures may include a plurality of motion sensor data associated with the plurality of motion sensors 202.

In some embodiments, the system 200 may further include a change detection sensor configured to detect a change in the field of interest 214 configured to detect. Further, the processing device 206 may be configured for triggering training of the deep Q-learning module 210 based on one or more of the change and detection of an unpredictable event associated with the at least one trajectory data.

In some embodiments, the motion sensor model may include at least one motion sensor characteristic of the motion sensor 202A. Further, the at least one motion sensor characteristic may include at least one operational characteristic. Further, the at least one operational characteristic may include a type of the motion sensor 202A, a sensitivity of the motion sensor 202A, a range of detection of the motion sensor 202A, an angle of aperture of the motion sensor 202A, a resolution of the motion sensor 202A, an accuracy of the motion sensor 202A, a precision of the motion sensor 202A, a linearity of the motion sensor 202A and a time response of the motion sensor 202A. Further, the at least one motion sensor characteristic may include at least one dispositional characteristic. Further, the at least one dispositional characteristic may include one or more of a position of the motion sensor 202A and an orientation of the motion sensor 202A. Further, at least one of the range of detection, the orientation and the angle of aperture may constitute a "field of view" corresponding to the motion sensor 202A.

In some embodiments, the light source model may include at least one light source characteristic of the light source. Further, the at least one light source characteristic may include one or more of a type of light source, a position of the light source, an orientation of the light source, an intensity of the light source, a duty cycle of the light source, a spectral band of the light source, a color temperature of the light source, a thermal spectral band associated with the light source (such as for e.g. an infrared radiator), a thermal spectral band associated with infrared sources, a radiation pattern of the light source and a range of illumination of the light source.

Figure 3:
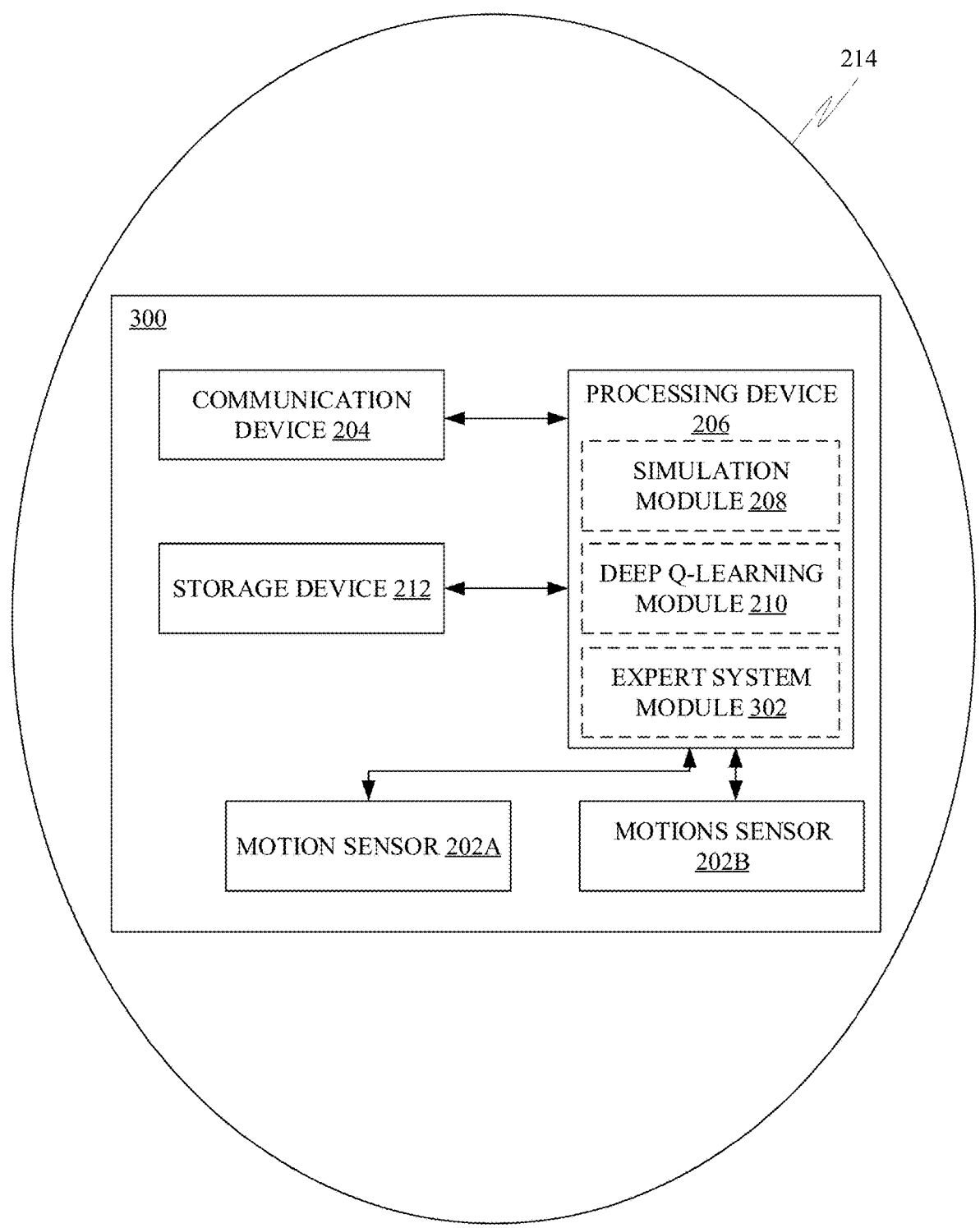
FIG. 3 shows a system for performing motion analysis in a field of interest, in accordance with some embodiments.

FIG. 3 shows a system 300 for performing motion analysis in a field of interest 214. The system 300 may include the plurality of motion sensors 202A-B configured to be disposed in the field of interest 214.

Further, the system 300 may include the communication device 204 configured for receiving configuration data associated with the field of interest 214 from at least one data source. Further, the system 300 may include the processing device 206 configured for generating a digital model corresponding to the field of interest 214 based on the configuration data using the simulation module 208.

Further, the system 300 may include the storage device 212 configured for storing the digital model and one or more of the plurality of motion signatures and the plurality of object signatures.

In some embodiments, the processing device 206 may be further configured for performing a second analysis of the plurality of motion data based on an expert system module 302. Further, the generating of the at least one trajectory data may be based on the second analysis.

In some embodiments, performing the second analysis may include generating Galilei wavelets based on a plurality of kinematic parameters. Further, the Galilei wavelets may be group representations computed from extended Galilei groups. Further, the plurality of kinematic parameters may be computed as spatio-temporal functions digitized in the space of the plurality of motion data. Further, the Galilei wavelets may facilitate analysis of the spatio-temporal functions transformed by motion. Further, the second analysis may include estimating at least one kinematic parameter based on the Galilei wavelets. Further, the estimating may be performed using an inverse problem technique based on a gradient algorithm with at least one objective function whose computation is based on the digitized Galilei wavelet transform. Further, the estimating of at least one motion trajectory may be further performed by dynamic programming using Bellman's recursive techniques. Accordingly, a cost function may be optimized using at least one Lagrangian function whose computation is based on the digitized Galilei wavelet transform.

Further, the continuous wavelets may be representations of the extended Galilei group in the space of the sensed signals (i.e. the plurality of motion data). Extension may be performed on the set of all the kinematic parameters which is composed of spatio-temporal location (space time position), dilation (scale), orientation, and velocity (all parameters of the analysis). Further, the inverse problem technique may be based on a gradient algorithm using an objective function to find the best matching parameter which is a best match filter and may be computed in space-time domain in the norm of functions in the space of the kinematic parameters as the square of the inner product between the sensed signal and the analyzing Galilean wavelet. Further, the motion trajectory computation may be performed by dynamic programming through Bellman's recursive equation using as cost function to be optimized as the Lagrangian function computed in space-time domain in the norm of functions in the space of the kinematic parameters as the square of the inner product between the sensed signal and the analyzing Galilean wavelet.

In some embodiments, the processing device 206 may be configured for performing predictive analytics based on historical data associated with motion analysis using the expert system module 302. Further, the generating of the at least one trajectory data may be based on the predictive analytics.

In some embodiments, the performing of the second analysis of the plurality of motion data may be based on a physics model and a field of interest model.

In some embodiments, performing the second analysis of the plurality of motion data may be based on Lie group representations of motion and waves as digitized continuous wavelets. Further, the generating of the at least one trajectory data may be performed as a filter matching though an inverse problem technique.

In some embodiments, the expert system module 302 may supervise and validate an output of the deep Q-learning module 210 based on an adaptive dual control. Further, in an unpredictable scenario, the expert system module 302 may perform one or more of training and updating of the deep Q-learning module 210 based on the second analysis.

Figure 4:
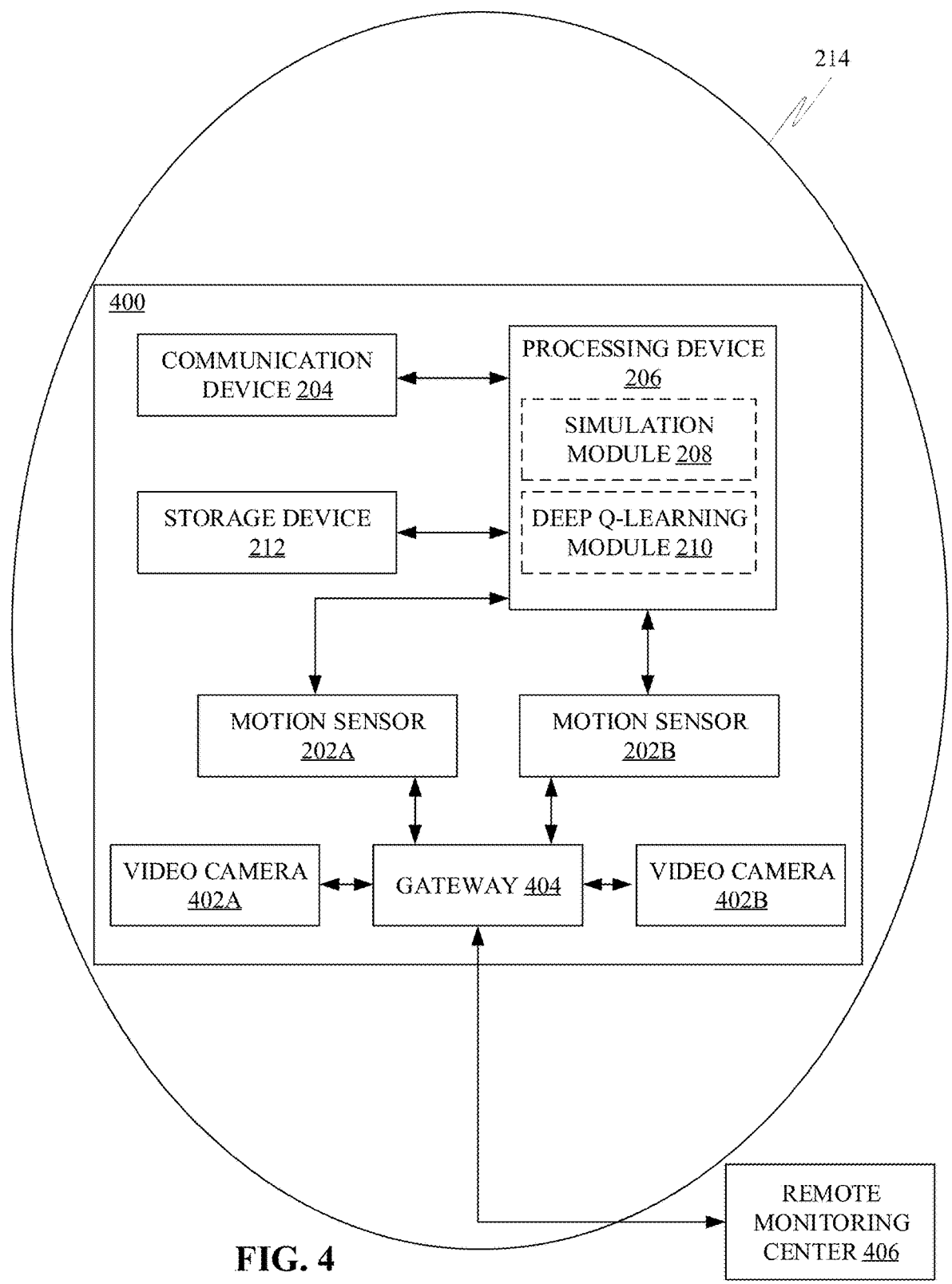
FIG. 4 shows a system for performing motion analysis in a field of interest, in accordance with some embodiments.

FIG. 4 shows a system 400 for performing motion analysis in a field of interest 214. The system 400 may include the plurality of motion sensors 202 configured to be disposed in the field of interest 214.

Further, the system 400 may include the communication device 204 configured for receiving configuration data associated with the field of interest 214 from at least one data source. Further, the system 400 may include the processing device 206 configured for generating a digital model corresponding to the field of interest 214 based on the configuration data using the simulation module 208.

Further, the system 400 may include the storage device 212 configured for storing the digital model and one or more of the plurality of motion signatures and the plurality of object signatures.

Further, the system 400 may include a plurality of video cameras 402A-B disposable at a plurality of key locations in the field of interest 214. Further, each video camera (such as the video camera 402A) may be configured to capture image sequences associated with a portion of the field of interest 214. Further, at least one video camera (such as the video camera 402A) may be configured to transmit a part of a corresponding image sequence to a remote monitoring center 406 through at least one gateway 404.

Further, the system 400 may include at least one gateway 404 disposable proximal to the field of interest 214. Further, the at least one gateway 404 may be configured as a two-way interface capable of communicating with the remote monitoring center 406 and the plurality of motion sensors 202A-B. Further, the remote monitoring center 406 may include the processing device 206. Further, the analyzing may be based on the image sequences.

Figure 5:
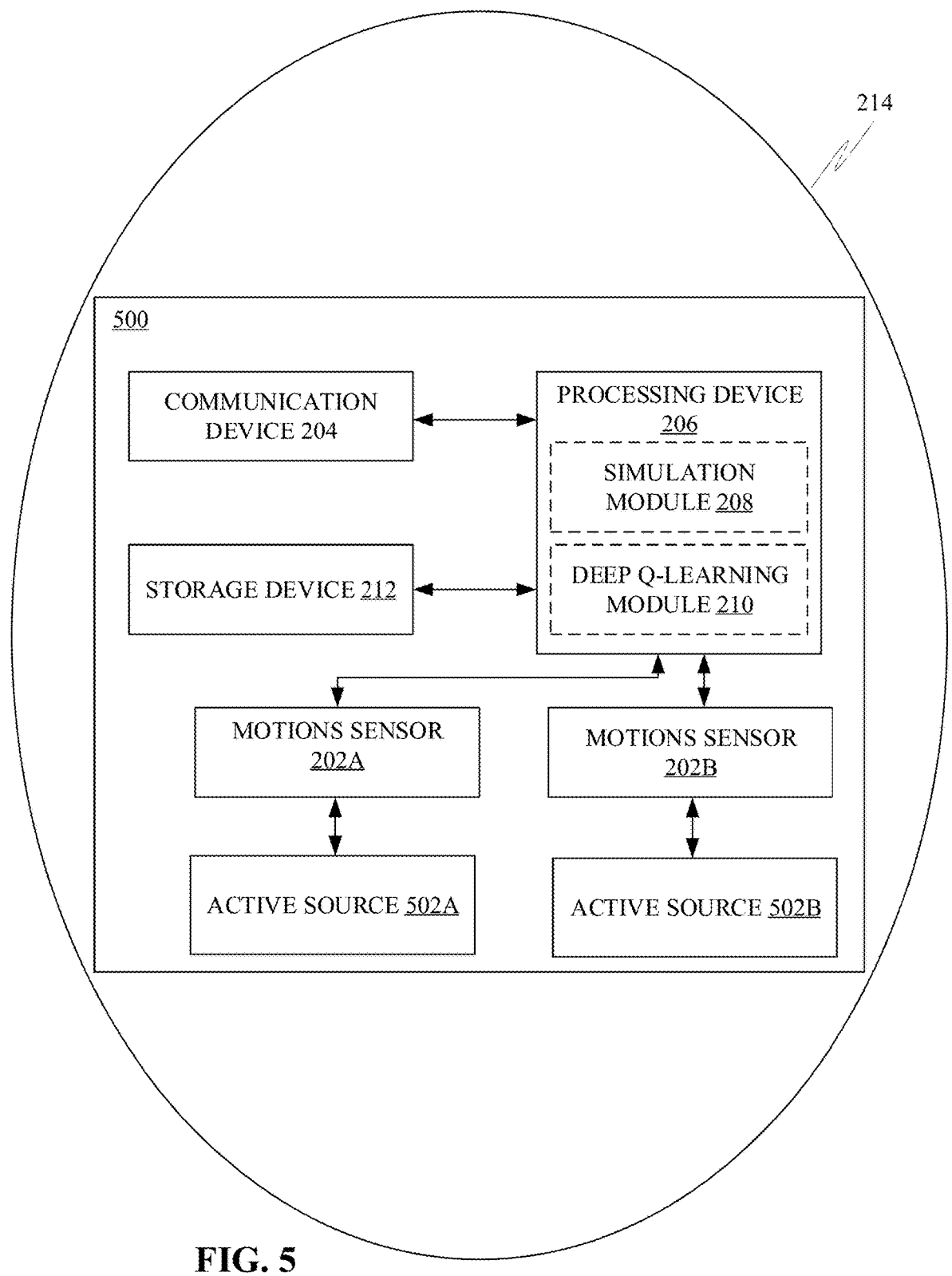
FIG. 5 shows a system for performing motion analysis in a field of interest, in accordance with some embodiments.

FIG. 5 shows a system 500 for performing motion analysis in a field of interest 214. The system 500 may include the plurality of motion sensors 202A-B configured to be disposed in the field of interest 214.

Further, the system 500 may include the communication device 204 configured for receiving configuration data associated with the field of interest 214 from at least one data source. Further, the system 500 may include the processing device 206 configured for generating a digital model corresponding to the field of interest 214 based on the configuration data using the simulation module 208.

Further, the system 500 may include the storage device 212 configured for storing the digital model and one or more of the plurality of motion signatures and the plurality of object signatures.

In embodiments, the system 500 may include a plurality of active sources 502A-B configured to emit source waves. Further, the plurality of motion sensors 202A-B may be configured to receive reflected waves corresponding to the source waves. Further, the plurality of motion sensors 202 may include one or more of a plurality of ultrasonic motion sensors and a plurality of microwave motion sensors. Additionally, in some embodiments, one or more of a plurality of ultrasonic motion sensors and a plurality of microwave motion sensors may be disposed at a plurality of key locations within the field of interest. Further, the processing device 206 may be configured for determining at least one characteristic difference between at least one source characteristic associated with the source waves and at least one reflected characteristic associated with the reflected waves. For example, in some embodiments, the at least one characteristic difference may include at least one of a time difference, a shape difference, a duration difference, an intensity difference and a frequency difference. Further, the processing device 206 may be configured for estimating at least one kinematic parameter associated with the at least one object in the field of interest 214 based on the at least one characteristic difference.

In some embodiments, the communication device 204 may be further configured for receiving a plurality of commands from at least one gateway communicatively coupled with the communication device 204. Further, the plurality of active sources 502A-B may be configured to operate in one or more of a plurality of emission modes based on the plurality of commands. Further, an emission mode of the plurality of emission modes may be characterized by one or more of a frequency of emission, a length of emission, a delay interval between consecutive emissions and a pattern of emission.

FIG. 6 show a motion-intelligent system that may be subdivided into three components (and/or layers). First component may include a sensor layer 602. Further, the sensor layer 602, in an instance, may be the lowest physical layer responsible for detection and measurement of kinematical parameters. The sensor layer 602, in an instance, may include different type of sensors such as specialty sensors 608, laser sensors 610, active motion sensors 612, microwave sensors 614, video cameras 632 (such as the video camera 402A and 402B), motion sensor network 616 etc. Further, second component may include a telecommunication layer 604. Further, the telecommunication layer 604, in an instance, may be in charge to transmit collected information to a gateway 404 or a data sink. Further, the telecommunication layer 604, in an instance, may include an upper physical layer (such as a layer of routers (such as router 618), detectors, and/or components responsible for carrier generation, modulation and frequency selection etc.), a data link layer (such as sub-routers 620), and/or a network layer (such as sub-sub-routers 622). Further, third component may include an application layer 606, in an instance, may include a transport layer (the Internet, radio or satellite communications through an Ethernet 624, a radio tower 626, and/or a satellite 628 respectively) and an application layer (the Cloud 630, workstations specialized in Artificial Intelligence especially deep learning neural networks).

Figure 7:
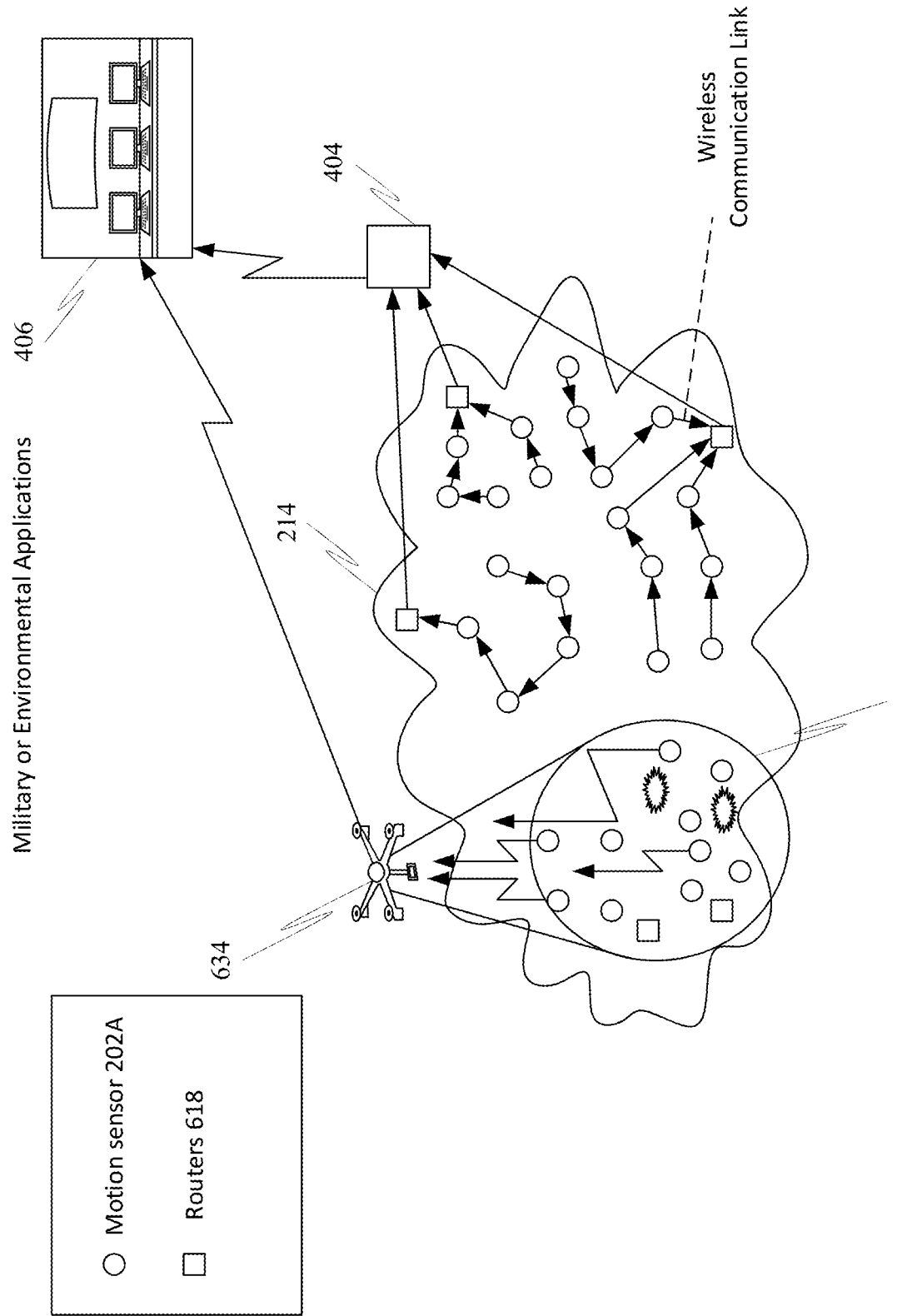
FIG. 7 show a Motion-Intelligent Field (Open Field Applications), in accordance with some embodiments.

A general setting of the motion-intelligent system may be described as follows. An operator may actively spread motion sensors (such as the motion sensor 202A and 202B) randomly in the field (such as the field of interest 214). Once released, each motion sensor communicates wirelessly with a sub-router either in a single hop transmission or through other neighboring sensors in a multi-hop transmission. Each motion sensor may transmit a digital information composed of sampled measurements originating from a photodetector array. Further, the data to be transmitted to the remote monitoring center 406 may at least contain a sensor identification number with a time stamp, and digital samples originating from the photodetectors, all digital samples may be entropy coded for transmission. Entropy coding may also imply that no information may be transmitted when no actual motion is detected. The data may be transmitted through sub-routers 620 to routers 618 and eventually reach a gateway (such as the gateway 404) to the Internet, to a local network, to a radio-communication system or a satellite communication. Each system aims to transport the aggregated information to the remote monitoring center 406 where a computer performs the motion analysis. In a regular setting, the motion sensors may be fixed on surfaces of construction buildings such as vertical walls and/or horizontal ceilings. Further, the motion sensors capture moving waves by photodetection in spectral bands of the visible light, the near-infrared and the mid-infrared. Further, the motion sensor network 616 may be implemented through different versions. Further, FIG. 6 presents a motion-intelligent field in an indoor/outdoor application. Further, FIG. 7 presents a motion-intelligent open field which corresponds to a field (such as the field of interest 214) that may be temporarily inaccessible for environmental (for instance, by presence of radioactivity) or military reasons (for instance, being located beyond enemy lines).

In a typical application like a building, a premise, a traffic or underground tunnel, video cameras may be pre-positioned on key spots and a network of motion sensors may be arranged over the field of interest 214, at best, on vertical outdoor structures, and on vertical and horizontal indoor structures. Further, in a typical military application, some drones or robots (such as a drone 634 and a robot 636, as shown in FIG. 6) equipped with video cameras 632 and active motion measurement devices spread motion sensors (such as the motion sensor 202A) as needed on an open field (such as the field of interest 214). The drone 634 (and/or the robot 636) may directly communicate with the remote monitoring center 406 and support several functions such as establish direct radio-communications with the local sub-router on the open field. Further, the drone 634 (and/or the robot 636) may be configured to locate positions of the active motion sensors 612 on the field of interest 214 with following steps, such as, Illuminate motion sensors with coded infrared beams, Record the information of the particular location as given by an embarked GPS, Receive the motion sensor identification through the local sub-router, and/or Transmit GPS location and corresponding motion sensor identification to the remote monitoring center 406. Further, the drones (or robots) may transmit directly to the remote monitoring center 406 all data collected from the local motion sensor network 616, the data stream issued from the video cameras 632 and active measurement devices.

Further, the drone 634 (or the robot 636) may have an ability to move and to focus video cameras 632 on targets of interest.

At the remote monitoring station 406, a raw incoming data provided by the gateways (such as the gateway 404) may be processed in two-step. The first step consists in a data reconciliation, and a reconstruction of the field in 3D by fusing all the data originating from the sensors, the camera and other data describing the topography of the field of interest 214. This stage may involve a so-called inverse problem to detect and estimate motion parameters of interest from the data produced by the sensor network and to perform classification and pattern recognition adding the data produced by the video cameras 632. The first step involves a motion analysis performed by a deep learning neural network where detection and estimations may be supervised by an expert system. The expert system may implement an accurate model of motion as it takes place in the field of interest 214, of sensors and of the field topology. At this stage, other inputs may be introduced that originate from additional active sensors. Those sensors may be based on sonar or radar techniques (acoustic or laser) to perform accurate measurements or based on detector techniques for chemical and radioactivity marking applications. Human supervision may be required to interpret a scene. Further, a human intervention may work to provide a feedback on the system of video cameras 632 to focus on areas of interest. A feedback on the motion sensor network 616 may also be activated to add new sensors in areas of interest or in areas where the inverse problem may require to be consolidated with a higher sampling density. Consolidation may be necessary to provide existing, unique and stable solutions to the current process under analysis.

Further, the second step may involve a motion analysis performed by a deep learning neural network (such as the deep Q-learning module 210, as shown in FIG. 2) in forms of a dual control approach in order to predict, track and construct trajectories of interest. Further, an algorithm may compare two or more inputs to select the optimal action of a Q-learning function. Further, one input may be provided by an expert system (such as the expert system module 302, as shown in FIG. 3) computing the motion control from models that rely on theoretical mechanics. Further, a second input may be produced by a neuro-dynamic programming algorithm following the path learned by the system at from the previous training.

Further, the sensors, in an instance, may be classified in four categories. The video cameras 632, in an instance, may have the purpose to provide high resolution images and videos that enable to perform pattern recognition and snapshots. Snapshots may enable to update and enlarge the data base of pattern to recognize. Further, the video cameras 632, in an instance, may be passive sensors that may be installed at key spots in the field. Further, the video cameras 632, in an instance, may be located at entrances and exits, at key passageway, and coupled with walk-through detectors and marking sensor meaning located at all spots where individual patterns may be singled out. Further, the video cameras 632 may be associated with each specific subfield and connected to the corresponding sub-router 620 of the motion sensor network 616. The sub-router 620 may enable on and off transmission of the video information to the remote monitoring center 406 on the basis of the motion detected in its sub-field of control. Further, the video cameras 632, in an instance, may located in areas of intense traffic that may concentrate groups of multiple patterns at the same moment (such as large halls, transport platforms etc.) by opposition to areas of limited size (such as underground traffic tunnel, corridors etc.) where traffic may not be intense.

Further, the video information may be fused with the motion sensor data to perform the motion analysis at the remote monitoring center 406. Further, the video camera may be connected on sub-router 620 or routers 618. The transmission of information from the video cameras 632 may be switched on and off at the sub-router 620 (and/or the sub-sub routers 622) function according to the moving activity detected by the motion sensors 202A in the subfield controlled by the sub-router 620. This on-off switching may have a purpose to limit an amount of video information propagating on the network and to make the system more efficient.

Further, the video cameras 632 may also be embarked in moving systems (such as the drone 634, and/or the robot 636) that may have the ability to move on demand to any spot of interest for perform closer and faster observations or actions. Further, the moving systems may be able to exchange information directly with the remote monitoring center 406 as well as with the local sensors at least through the sub routers 620. Those direct telecommunications channels may be exterior to the sensor network.

Further, active motion measurement devices may be intended to detect moving objects, conversations and sounds, and make precise measurements of kinematical parameters. Further, the motion-intelligent system may develop techniques relevant to sonars and radars for echo-location. Those systems may be based on ultrasounds, lasers and microwave and compute the Doppler effect as the frequency shift between the emitted and reflected waves which is proportional to speed. Those systems are well developed on the market. As a matter of fact, those sensors may be associated with the video cameras 632 in the field (such as the field of interest 214) and embarked in the drone 634 or the robot 636 to perform more precise tracking and recognition. Each active sensor (such as the active motion sensor 612) may be associated and communicating with a sub-router (such as the sub-router 620).

Further, marking sensors may be specialized sensors made to label individuals, moving patterns or equipment's of interest. Marking sensors may be active or passive depending on whether or not they transmit a signal to motion detectors.

Further, Passive marking sensors (such as the specialty sensor 608) are typically walk-through detectors that may detect the passage of individuals or a moving pattern that carry a special source of radioactive, chemical or biological elements, that carry pieces of metal or any other abnormal or suspicious detectable items. Further, the passive marking sensors may be coupled with video cameras 632 to record, picture and recognize the individuals. Once marked, the moving pattern may be traced all along its path in the field of interest 214. Further, the passive marking sensors may be installed at entrances and exits, gates or key passing corridors. Each passive marking sensor may be associated and communicating with a sub-router.

Further, an active marking sensor may be a device that may produce a signal, electromagnetic wave, to be identified and detected by the motion sensors. Examples of active marking sensors may be active badges or labels that provide a means of locating individuals, equipment and moving patterns within a building by determining the location of their active badge. Active badges or label may produce an infrared signal with a limited infrared spectral bandwidth using an on-off modulation technique that may be destined to specific sensors included in the motion sensor. Several bands may be used according to different groups of markers. Further, a message may contain a protocol of communication and the useful information composed of a time stamp and an identification number. Once received by a motion sensor (such as the motion sensor 202A), the information may be relayed with the sensor identification and specific time stamp through the network to the gateway 404 and eventually sent to the remote monitoring center 406. Abnormal situations may be detected when the location detected by the motion sensor of the pattern carrying the active badge no longer corresponds to the position transmitted by the badge.

Figure 8:
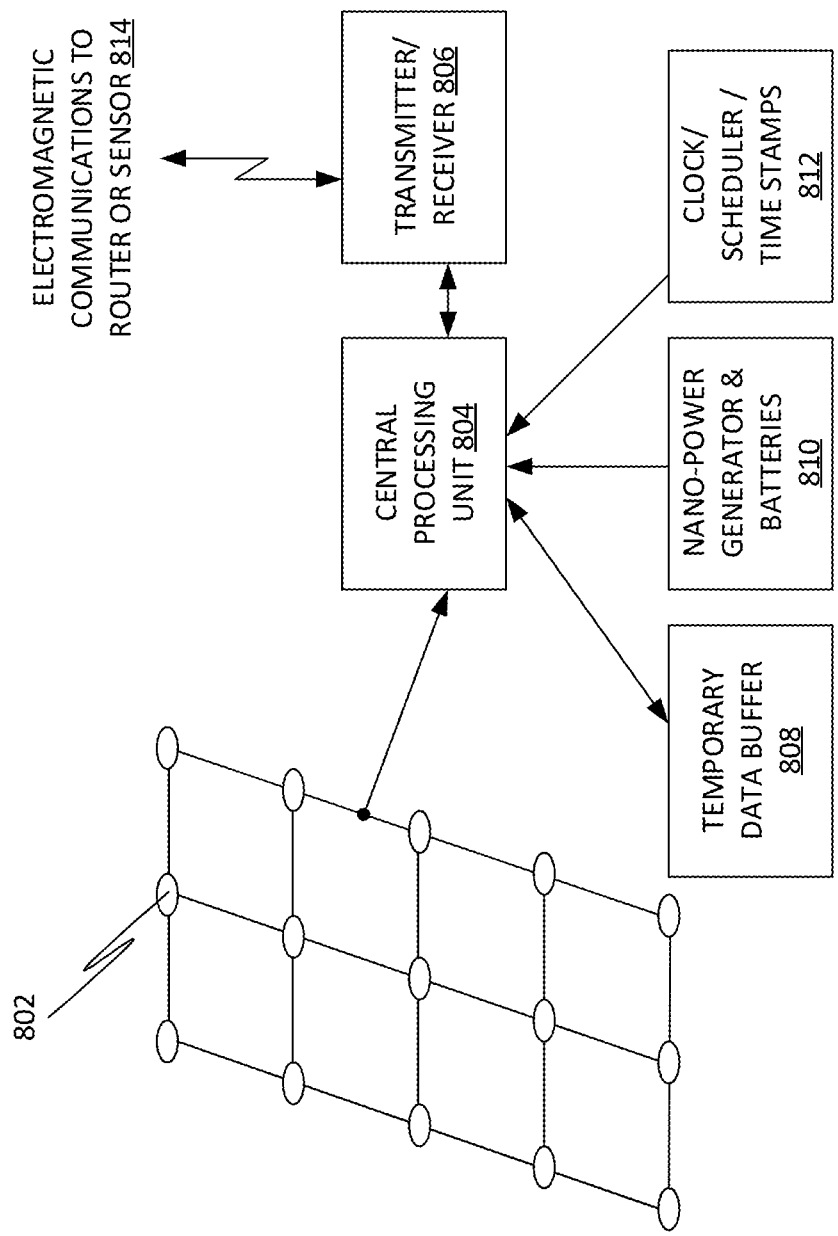
FIG. 8 shows Motion sensor Functions, in accordance with some embodiments.

Further, each individual motion sensor may have a capability to perform operations as referred in FIG. 8. Accordingly, the operation may include (but not limited to) local digital processing (using central processing unit 804), clocking and time stamping (through clock/scheduler/time stamps 812), Memory storage or buffer management (by using temporary data buffer 808), Photo-detection through an array of photodetectors 802, Electromagnetic communications with a sub router or another sensor 814, Nano-Power generation and Nano-batteries (using Nano-power generator and batteries 810). Further, additional functions may be implemented such as Nano-GPS (not shown), and/or an Orientation measurement (not shown).

The motion sensors may be composed of an array of photodetector units (such as the array of photodetectors 802). Further, each photodetector (such as a photodetector 900) with angle of view 902 may be made of a microlens 904 that may funnel the light to a substrate 906 made of up to nine hundred quantum dots 908 as shown in FIG. 9. Further, the Photodetector 900 may mimic an insect ommatidium. The major challenge of the motion sensors may be posed by the very limited amount of energy that may be stored in nano-batteries, a situation which requires the use of energy-harvesting systems. Further, piezoelectric nano-generator have been recently proposed. Further, the sensor may need a memory buffer (such as the temporary data buffer 808). Further, the memory buffer may be modeled by a queueing system. The queue size may be determined by the maximum number of data to be stored. A piece of information to be stored may be made of a photodetection sample and the corresponding time stamp. The local digital processor feeds the memory buffer at a deterministic rate that corresponds to the sampling rate and the amount of data produced to the number of detectors. Further, an energy harvesting device generates energy by packets which arrival follows a model that may be described by a Poisson process. The resulting model is a queue of fixed size, feed by a deterministic rate and emptied by a Poisson process with acronym D/M/1.

The motion sensors may be attached to permanent construction structures like walls and ceilings. Both structures are available inside buildings, in tunnels for road traffic and in underground transportation. This setting allows to collect two projections of the motion which are namely vertical with the walls and horizontal with the ceiling. The first question is to determine the distance between two detectors or what should be their density on the structure. The best solution is to consider the sensor angle of view and the distance to the opposite parallel structure. For example, let us consider projections on horizontal structures with detectors located on the ceiling. Each detector is characterized by a given field of view that ends up covering on the opposite floor some area. Let us assume by symmetry that this later area is in form of a disk. A disk is by definition a region on the plane of the floor limited or bounded by a circle. Let consider and refer this disk under the generic name of a tile.

Figure 11:
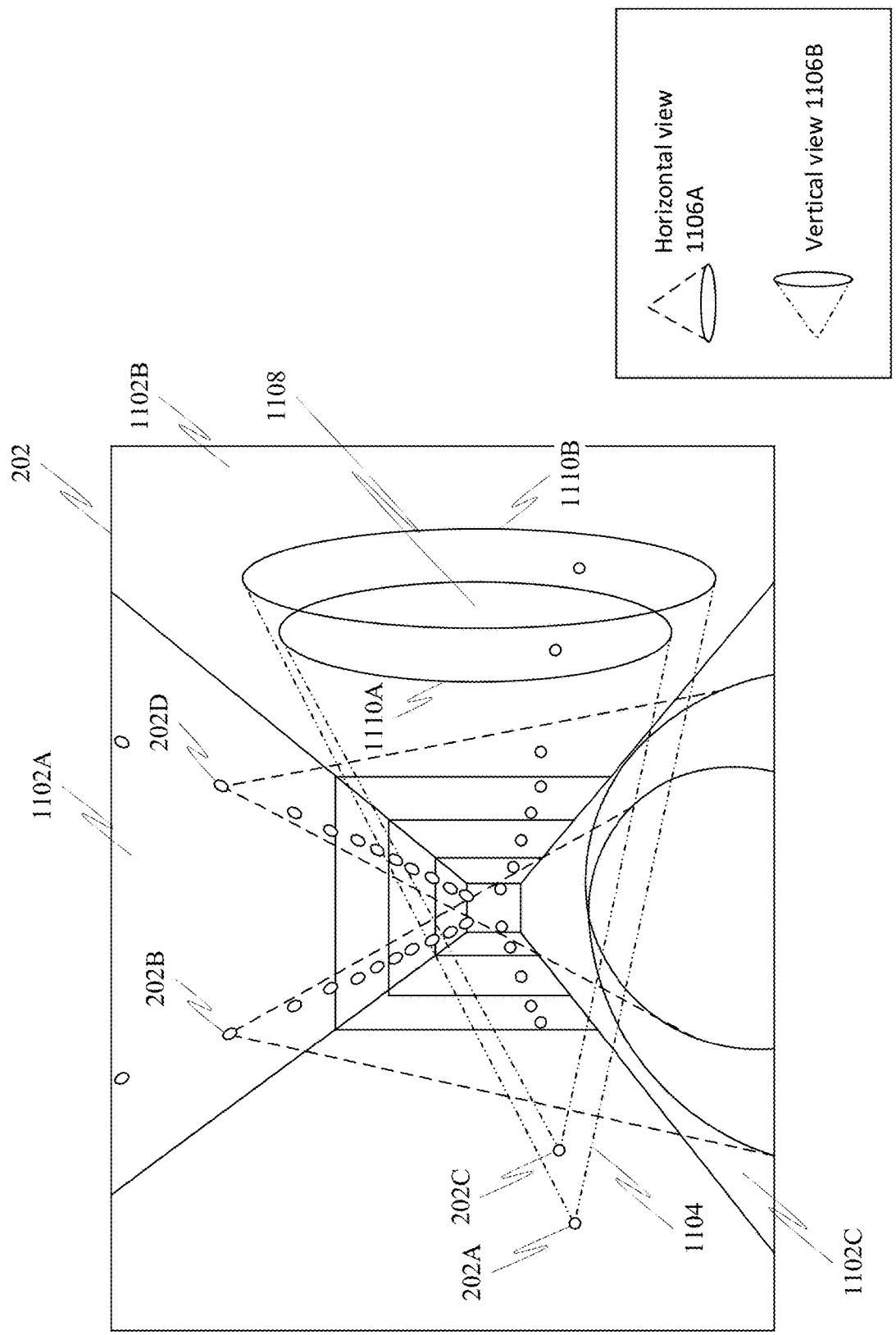
FIG. 11 shows Motion Sensors in Buildings, in accordance with some embodiments.

FIG. 11 shows an exemplary representation of the plurality of motion sensors 202A-D disposed on the at least one surface of an environment 1114. For instance, the motion sensor 202A and 202C may be disposed at a wall opposite to the wall 1102B in the environment 1114. Further, the motion sensor 202B and 202D may be disposed at the ceiling 1102A in an environment 1114.

Further, in some embodiments, the plurality of motion sensors 202A-D may be associated with a plurality of field of views (such as a horizontal view 1106A, a vertical view 1106B). Further, a field of view of a motion sensor (such as the motion sensor 202A) may include a spatial region 1104 within which a motion of an object may be detectable by the motion sensor 202A. Further, in some embodiments, the spatial region 1104 may include a three dimensional region. Further, in some embodiments, the spatial region 1104 may include a one dimensional region. Further, in some embodiments, the spatial region 1104 may include a two dimensional region.

Further, in some embodiments, the environment 1114 may include a field of interest. Further, the field of interest defines a region of interest within which at least one motion event corresponding to at least one object may be detectable. Further, the field of interest (total environment under monitoring) may be composed of a plurality of region of interest (connected, disjointed, or, overlapping). Further, each region of interest may be comprised in one field of view or a plurality. Further, each region of the field of interest may be comprised in at least one field of view of the plurality of field of views.

Further, in some embodiments, the spatial region 1104 may include a three dimensional conical region characterized by an apex point coincidental with a position of the motion sensor 202A, a height of the cone and a direction of the cone in relation to the at least one surface (such as a wall opposite to the wall 1102B) on which the motion sensor 202A may be disposed. Further, in some embodiments, the direction of the cone is one of a vertical direction, a horizontal direction, and an angled direction.

Further, in some embodiments, the plurality of field of views (such as the vertical view 1106B) may include at least two intersecting field of views (such as intersecting field of view 1110A and 1110B) characterized by at least one overlapping region (such as an overlapping region 1108). Further, the at least two intersecting field of views (such as the intersecting field of view 1110A and 1110B) corresponds to at least two intersecting motion sensors (such as the motion sensor 202A and 202C) of the plurality of motion sensors 202A-202D. Further, a motion event occurring in the overlapping region 1108 may be detectable by each of at least two intersecting motion sensors 202A and 202C.

Figure 12:
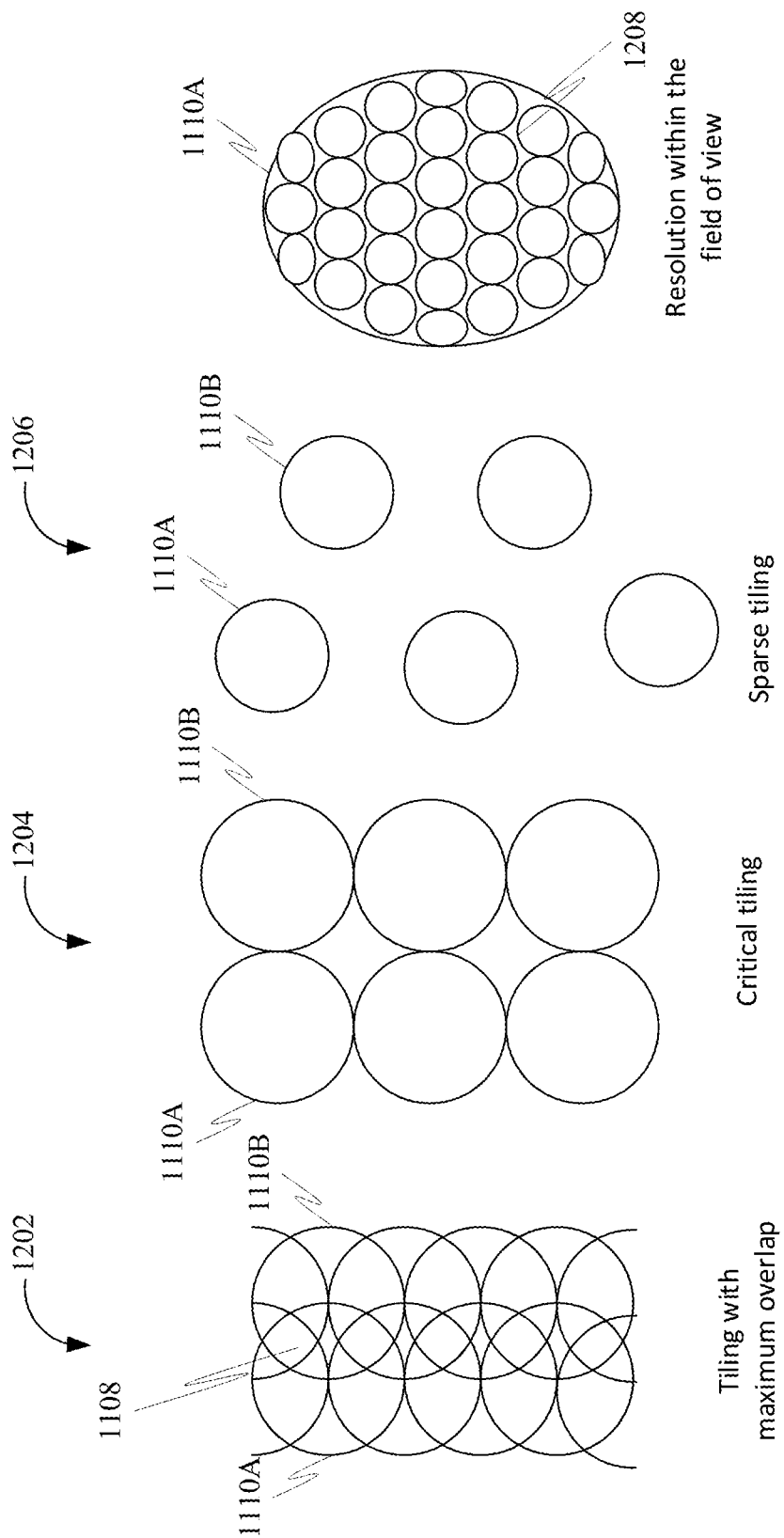
FIG. 12 shows tiling with motion sensors and sensor resolution, in accordance with some embodiments.

Further, in some embodiments, the processing device 206 may be configured for determining a probability of failure associated with a motion sensor (such as the motion sensor 202A) of the at least two intersecting motion sensors 202A and 202C. Further, the processing device 206 may be configured for determining a number of the at least two intersecting motion sensors (such as the intersecting motion sensors 202A and 202C) based on the probability of failure. Further, the plurality of motion sensors 202A-D may include the number of the at least two intersecting motion sensors 202A and 202C. Further, with reference to FIG. 12, the at least two intersecting motion sensors (such as the motion sensor 202A and 202C) may be oriented (tilted) in a way such that the at least two intersecting field of views (such as intersecting field of view 1110A and 1110B) may result in a maximum overlap 1202, or a critical overlap 1204, and/or a sparse overlap 1206. For instance, the maximum overlap 1202 may include the overlapping region 1108 that may cover a maximum area. Further, in another instance, the critical overlap 1204 may include the at least two intersecting field of views (such as intersecting field of view 1110A and 1110B) characterized without any overlapping region 1108. Further, in another instance, the sparse overlap 1206 may include the at least two intersecting field of views (such as intersecting field of view 1110A and 1110B) that may be placed at a significant distance from each other with no overlapping region 1108. Further, in some embodiments, a resolution associated with the intersecting field of view 1110A may be determined by the processing device 206, which may be dependent on a number of photodetectors (such as a photodetector in the array 802) pilling-up in an array.

In a further embodiment, the arrangement of the motion sensor in buildings are presented in FIG. 11 and similarly for tunnels. Let us call by interval the distance between two consecutive detectors along one axis x or along the perpendicular axis Y. The maximum tiling frequency shall correspond to interval equal to half the tile diameter, i.e., the radius. Such overlap of several different aperture cones to cover motion enables the system to perform triangulations since the moving pattern is detected from different sensors at the same time. More density would not bring more redundant information for less accuracy. Accuracy is also related to the detection resolution which is given by the number of individual photodetectors that are inserted inside the motion sensor as presented in FIG. 12. Less density decreases the redundancy and the accuracy to locate the position. The critical tiling is reach when the interval between two consecutive detectors is equal to the tile diameter. At critical tiling, each piece of floor is covered by only one single detector, and for lower sensor density or longer intervals, there would be gaps between the tiles on the floor, and therefore, gaps in the detection. The same situation exists on the walls for projections on vertical structures. But both walls can be covered with motion sensors leading to several possibilities, namely one wall, both walls, both with alternate position. Using both vertical and horizontal projections, it is possible to build three-dimensional paths.

The resolution that is achieved for each motion sensor inside the angle of view depends on two variables, the number of individual photodetectors actually inserted in the array of the motion sensor, and, the distance between the two horizontal or vertical structures that determines the size of the tile.

The resulting projection of the photodetector field of view on the tile determines the size of the smallest details that can be detected and positioned without any uncertainty. The field of view of a particular detector is subject to an uncertainty relation for the simultaneous measurement of velocity and position when the moving pattern has a size that is below the resolution threshold. See addendum.

Figure 10:
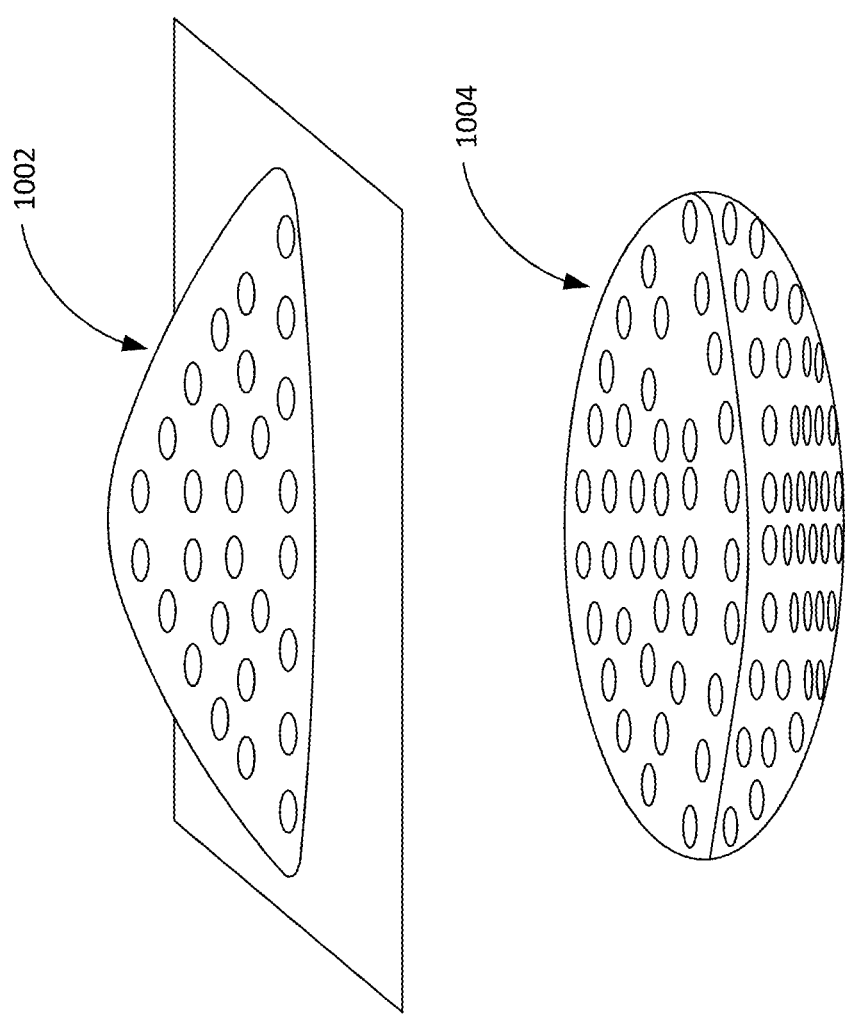
FIG. 10 shows motion sensor shapes and photodetector distribution, in accordance with some embodiments.

Motion sensor to be attached on vertical or horizontal structures are presented in FIG. 10. Motion sensors for open field applications can be made with a semilunar shape 1002 or a spherical shape 1004 equipped of photodetectors to cover 360 degrees on in all directions as presented in FIG. 10. Photodetectors can be implemented to mimic insect vision with thousands of individual photoreceptor units. Compound eyes possess a very large view angle, can detect fast motion, and in some cases, polarization of light. Moreover, insects can adapt to nocturnal vision and dimmed lights and cover the near infrared. Each motion sensors shall also be equipped with some basic signal processing and information storage capabilities, nano-batteries and wireless communications.

The network communications, telecommunications, multi-hop among the motion sensors or single hop to the sub-routers, from sub-routers to routers and eventually to the gateway are not part of this description and patent rights belong to others. The information to be transmitted is composed of a data transmission protocol followed by the sensor identification number on 24 bits, a time stamp 24 bits and the corresponding digitized photodetector samples which are readings holding on 12 bits each, meaning n times 12 bits for n sensors in the array. The bit rate out of a motion sensor would be a variable bit rate of entropy coding ranging from zero in quiet periods to one or a few Kilobits per second during a peak traffic period. The resulting bit rate also depends directly on the density of photodetectors that are implemented in the motion sensor. Simple error correction can be implemented as parity checks. Information transmitted over the sensor network can be encrypted but the actual protection of such punctual motion information is not a critical issue since just the remote monitoring center is able to reconcile all data with the topographic description of the field. The data that need to be protected are the final records derived for further statistics after all monitoring work is performed.

At the remote monitoring center, the data transmitted from the gateway are analyzed in real time for detection and classification and presented to human supervisors. The supervisors have the possibility to select moving patterns of interest to be tracked and captured by video cameras. The system classifies all detected motions, by scale, shape, volume, velocity, orientation and other criteria introduced during the deep learning neural network training. The system performs pattern recognition from the cameras, estimates trajectories from the data collected by the sensor system as far as it is feasible by a real-time processing. All collected data are recorded to enable further off-line analyses and to perform statistics.

The raw incoming data aggregated by the telecommunication network are supplied by the gateway. The data are processed in two steps as follows:

1. The first step consists in a data reconciliation. Raw data are reconciled and re-ordered in time and space on the topographic representation of the field. The representation of the field is acquired or introduced during the initial phase of training of the system. The algorithm proceeds with a motion detection and estimation performed from the different sensors in the field and with pattern classification and recognition.
2. The second step proceeds further in the motion analysis with motion prediction and trajectory estimation.

The algorithm is able to analyze the captured signals according to different kinematical parameters of interest. These kinematical parameters are defined from different spatio-temporal transformations. The algorithm incorporates the following transformation parameters:

1. Spatial and temporal translations, respectively denoted by $b \in R^n$ and $\tau \in R$, provide the spatial and temporal location.
2. Spatial rotation, with the matrix of rotation in three-dimensions of which the parameter is denoted by $r \in SO(3)$. This parameter provides the orientation of the principal axis of the pattern in term of two main directions being the horizontal and the vertical or referring to the angle of deflection towards those two main directions.
3. Spatial dilation, with the non-zero positive parameter $\alpha \in \mathbb{R}_*^+$ provides the scale.
4. Velocity transformation, with parameter $v \in R^n$, provides the velocity vector. The velocity not only includes the magnitude of the vector defined as the speed, but also the vector orientation through the components of velocity vector.

The first step consists in a data reconciliation and a reconstruction of the "3D+T" field by the fusion of the data originating from the sensors and the video cameras with other data describing the topography of the field. This stage involves a so-called inverse problem that computes estimates of the kinematical parameters of interest from the data produced by the sensor network. At this stage, a human intervention may be required to interpret the scene. The human intervention further works to provide a feedback on the system of video cameras in order to focus on areas of interest.

The algorithm implemented in this system is based on an inverse problem technique. An inverse problem is the technique that enables to compute the values of the parameters of physical transformations that take place in a field where the events are not directly observable. The inverse problem is the mathematical process that consists of collecting data, in form of digital signals, from a sensor array in order to calculate the causal parameters that have produced them. The causal parameters can only be estimated if an accurate model of the transformations that produced them is known. The inverse problem technique enables the estimation and the analysis of structures that are located beyond the sensor network, and therefore, that are not accessible.

In this inverse problem, detection and motion analysis are solved by a dual control process functioning on two main modes which are namely a deep learning neural network and an expert system. Those two modes can be outlined as follows:

1. The deep learning process relies on an intelligence learned by training, retraining and updating the system on the basis of a big data source. This process refers to an empirical way of learning also known as a bottom up approach and can be compared to action routinely and/or unconsciously performed by the brain.
2. The expert system relies on a precise model of motion on the field and the capture of electromagnetic waves by the motion sensors to compute resulting kinematical estimates.
   This process refers to a rational way of learning also known as a top down approach and can be compared to educated and conscious brain calculations.

On situation of interest, the dual control can also proceed to a third mode which freezes or locks the control on a specific pattern of interest. Depending on the predictability or the unpredictability of the environment, the dual control algorithm proceeds differently to make decisions. Decisions can be based on two or more available chains of action command. The following describes three main ways to proceed:

1. Periods where the environment predictable corresponds to situations that have been learned during the training. In predictable situations, the deep learning algorithm can work standalone and take actions that rely to its training, meaning the training originally received during the initial learning phase of the system or the latest training update. During those training periods, the weights or the hyper parameters of the neural network were computed for optimal motion analysis.
2. In situations that deviates from the statistics and become unpredictable, the deep learning can take actions that refer to an accurate model, the so-called expert system, which performs the optimal motion analysis.
3. In special situations where the neural network can rely on additional accurate motion measurements made by an active system (like Doppler measurements through ultrasounds or laser system), the supervisor can freeze the control on the measurements performed by the active system.

Figure 17:
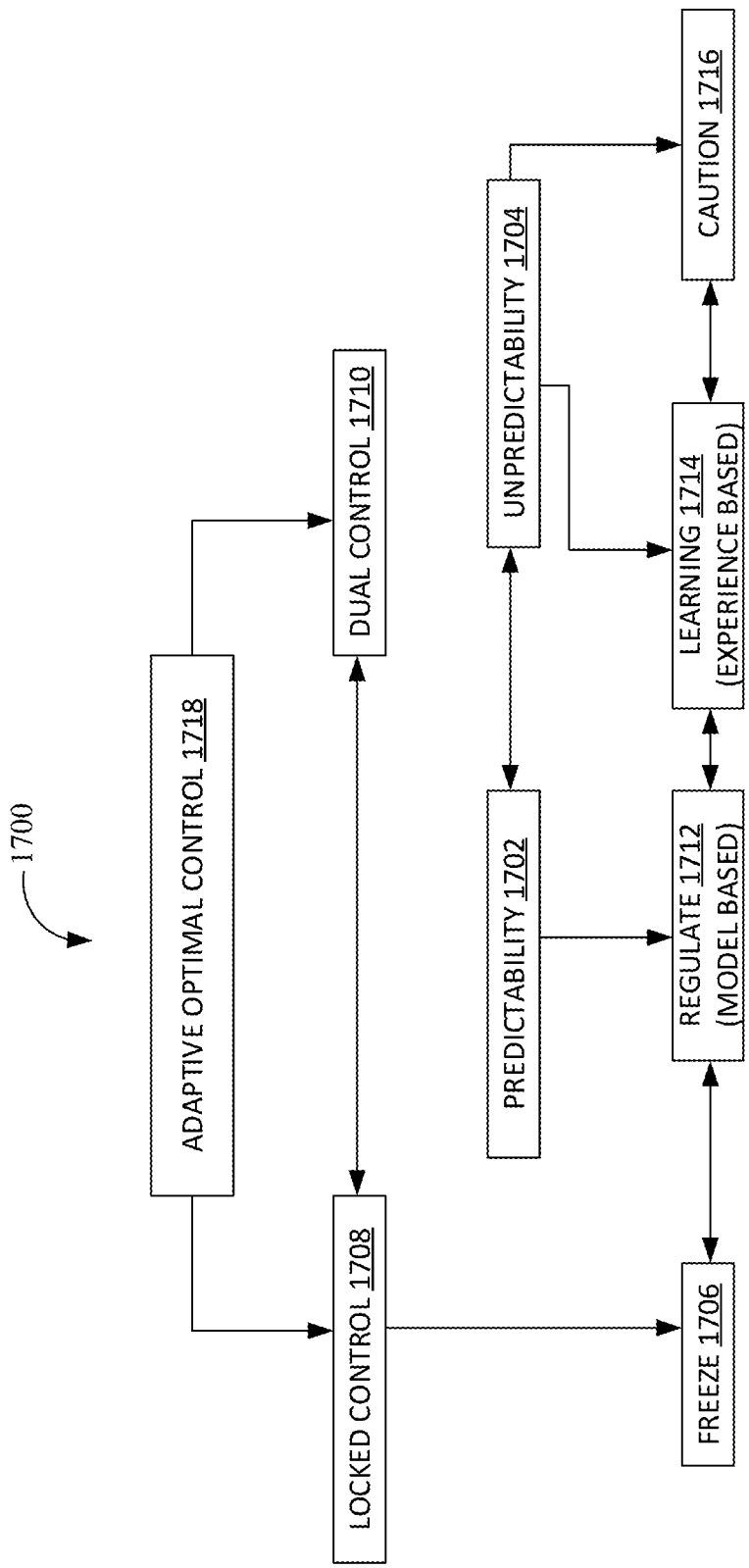
FIG. 17 shows an adaptive dual control scheme, in accordance with some embodiments.

The adaptive dual control system is sketched on FIG. 17.

The expert system algorithm performs a motion analysis on the data that are collected. The motion analysis is based on the true and exact model of the underlying physics and mechanics involved in the motion and the sensor units. The data that are collected are moving signals that are sampled from the motion sensor network and the video cameras. The moving signals are spatio-temporal functions S (x, t) that belong to the Hilbert space $L^2$ ($R^n \times R$, $d^n x dt$) where x stand for the three-dimensional spatial dimensions and t for the temporal dimension. In the scope of this algorithm, the moving signals can be parameterized through kinematical transformation of which the parameters need to be estimated. It turns out that the motion parameters combine in an algebraic structure which can be identified as the element of a group G which will refer to the Galilei group.

The motion model to be presented is based on the true theoretical mechanics as it takes place in the field. The physics of mechanics and quantum mechanics is ruled by Lie groups. In this model, a Lie group will be presented which is the Galilei group that explains how kinematical parameters combine with each other to generate motion as it is performed in nature. Moreover, the theory developed for quantum mechanics applies to classical mechanics. For example, it is possible to build functions in the functional space of the captured signals that are representations of the Galilei group. Those representations can be designed as analyzing tools and will be called wavelets for the special analyzing properties they are endowed by mathematics. The analyzing wavelets used in this project are called Galilei wavelets. Galilei wavelets extend the concept of Eigen functions of eigenstate to the Galilei group G. The meaning is that Galilei wavelets extend the harmonic or Fourier analysis to functions transformed by the action of motion or that Galilei wavelets analyze functions in function spaces where transformations are ruled by the Galilei group. To outline, the expert system computes the analyzing functions, so-called Galilei wavelets, in the space of the captured signals to estimate the value of the motion parameters. The analyzing functions used in the expert system are group representations computed from the algebraic group G.

The next step proceeds with the description of how the expert system deploys this model based on the true physics and mechanics that takes place on the field and in the detectors as a means to estimate the kinematical parameters in a technique called the inverse problem. The resolution of the inverse problem is performed by an ascending gradient algorithm on objective function and the sequel describes how to implement in this algorithm to solve the inverse problem.

The theoretical mechanics method keeps on going by the construction of trajectories which is based on the Euler-Lagrange equation and corresponds to the extremum of a functional. As such the theory provides analytical solutions to the problem of building trajectories. As a major point, algorithms have been developed during the second part of the 20th century that build the path that optimizes the value of a function, called reward or cost function. As another point, those algorithms have computer implementations. The computational construction of trajectories relies on the Bellman equations that founded dynamic programming where a reward function is to be optimized over a long-term range. The basic concepts of dynamic programming were originally prefigured by John von Neumann, but Richard Bellman provided the final formalism. The recent increase in computer power has enabled the implementation of this technique with neural networks.

For the Lie group of kinematical parameters, the motion analysis algorithm implements an extended version of the group of physics called the Galilei group. The Galilei group is a Lie group defined in physics that describes the algebraic structure of the motion and wave propagation transformations that takes place in the "3D+T" field. The algorithm of the expert system uses an extended version of the Galilei group that adds two parameters, namely the scale and the orientation. For this reason, this extension is called the extended-Galilei group or the affine-Galilei group. The resulting group combines all the useful space-time transformations into an operator $\Omega$. When the operator $\Omega$ is applied with specific parameter values on admissible functions, it generates an entire family or a set composed of an infinite number of analyzing functions. Each function is parameterized with the specific value introduced for kinematical parameters. This set of functions enables to analyze the content of the captured signals according to any kinematical parameters. The resulting operator $\Omega$ that is used in this algorithm incorporates all the kinematical parameters and takes the form of the following matrix transformation:

$$\Omega(b, \tau; v; a, r) = \begin{pmatrix} ar & v & b \\ 0^T & 0 & \tau \\ 0^T & 0 & 1 \end{pmatrix}. \quad (3)$$

acting on the column vector of spatio-temporal variables $(x \ t \ 1)^T$. The set of the parameters associated to this operator $\Omega$ formulate the algebraic structure of a group G which generic element reads:

$$G = \{g | g = (b, \tau; v; a, r); b \in \mathbb{R}^n, \tau \in \mathbb{R}, v \in \mathbb{R}^n, a \in \mathbb{R}_*^+, r \in SO(n)\} \quad (4)$$

where the law of composition can be expressed from the matrix multiplication:

$$g \circ g' = (b + arb' + r'v; \tau + \tau'; v + arv'; aa', rr') \quad (5)$$

This law of composition is associative but non-commutative as the result of the isomorphism to the matrix multiplication. At this stage, either the identity element or the inverse element needs still to be specified since they imply each other. Accordingly, the identity element can be specified as e=(0, 0; 0; 1, $I_3$) where $I_3$ is the three-dimensional identity matrix. The inverse element can then be computed from the matrix inverse and is given by:

$$(b, \tau; v; a, r)^{-1} = (a^{-1} r^{-1} [\tau v - b], -\tau; -a^{-1} r^{-1} v; a^{-1}, r^{-1}) \quad (6)$$

This law of composition defines a locally compact group which means that each element has a neighborhood which closing is compact. Such topological property enables integration on the parameters. In this group, two invariant measures can be defined as left and right invariant Haar measures respectively denoted here by $d_{\mu l}$ and $d_{\mu r}$. As any measure, both are as defined by the element of volume generated by infinitesimal displacements applied on the group parameters. Therefore, $$\mu_l = \det \left| \frac{\partial (g \circ g')}{\partial g'} \right|^{-1}_{g'=e} d^n b \bigwedge d\tau \bigwedge d^n v \bigwedge da \bigwedge dr \quad (7)$$

$$= a^{-(2n+1)} d^n b d\tau d^n v da dr$$

-continued $$\mu_l = \det\left|\frac{\partial(g'og)}{\partial g'}\right|^{-1}_{g'=e} d^n b \wedge d\tau \wedge d^n v \wedge da \wedge dr \quad (8)$$
$$= a^{-1} d^n b d\tau d^n v da dr$$

where dr is the invariant measure on SO(n), and n=3. As the right and left Haar measures are not equal, the group is called non-unimodular. Usual computations proceed to determine the corresponding Lie Algebra. Joint and adjoin action shall support the construction of the Stone-von-Neumann representations in the Hilbert space of interest using the Mackey technique of orbit constructions.

In group representations, the operator $\{\Omega: L^2(R^n \times R, d^n x dt) \to L^2(R^n \times R, d^n x dt)\}$ defined on the parameter set (b, τ; v; a, r)∈G generates the analyzing set of wavelets $\Psi \to \Omega_{b,\tau;v;a,r}\Psi$. The properties that the representations must fulfill to define continuous spatio-temporal wavelets are the following triplet: unitary, square-integral able and irreducible. Group representations are derived by this technique in the dual space $L^2(R^n \times R, d^n k d\omega)$ which is equivalent to a Fourier space where k and ω stand respectively for the spatial and temporal frequencies. In this section, the hat symbol is used above functions to represent their Fourier version and the bar symbol to represent their complex conjugate. The representations in the Hilbert space are of the form:

$$[\Omega(g)\hat{\Psi}](k,\omega) = a^{n/2} \exp[i(k \cdot b - \omega\tau)]\hat{\Psi}(k',\omega') \quad (9)$$

with $$k' = ar^{-1}k$$

$$\omega' = \omega - k \cdot v \quad (10)$$

To fulfill the square-integrability condition, a candidate wavelet Ψ(k, ω) has to satisfy the following condition of admissibility meaning that there exists a finite constant $C_\Psi$ such that:

$$C_\Psi = (2\pi)^{n+1} \int_{-\infty}^{\infty} \frac{|\hat{\Psi}(k,\omega)|^2}{|k|^n |\omega|} d^n k \, d\omega < \infty \quad (11)$$

meaning that the admissible function $\hat{\Psi}$ is of finite energy or square-integral able over the entire space of the kinematical parameters.

The analysis of the captured spatio-temporal signals S (x, t) is performed as an inner product of the signals S(x, t) and the analyzing wavelet functions $\Psi_{b,\tau;v;a,r}(x, t)$ which reads:

$$W[S(x, t); b, \tau; v; a, r]$$
$$= C_\Psi^{-1/2} \langle \Psi_{b,\tau;v;a,r} | S \rangle \quad (12)$$
$$= C_\Psi^{-1/2} \int_{-\infty}^{\infty} d^n x dt \overline{\Psi}\left[r^{-1}\left(\frac{x-b-v}{a}\right), t-\tau\right] S(x, t) \quad (13)$$
$$= C_\Psi^{-1/2} \int_{-\infty}^{\infty} d^n k d\omega \overline{\hat{\Psi}}(ar^{-1}k, \omega - k \cdot v) \hat{S}(k, \omega) \quad (14)$$

Figure 14:
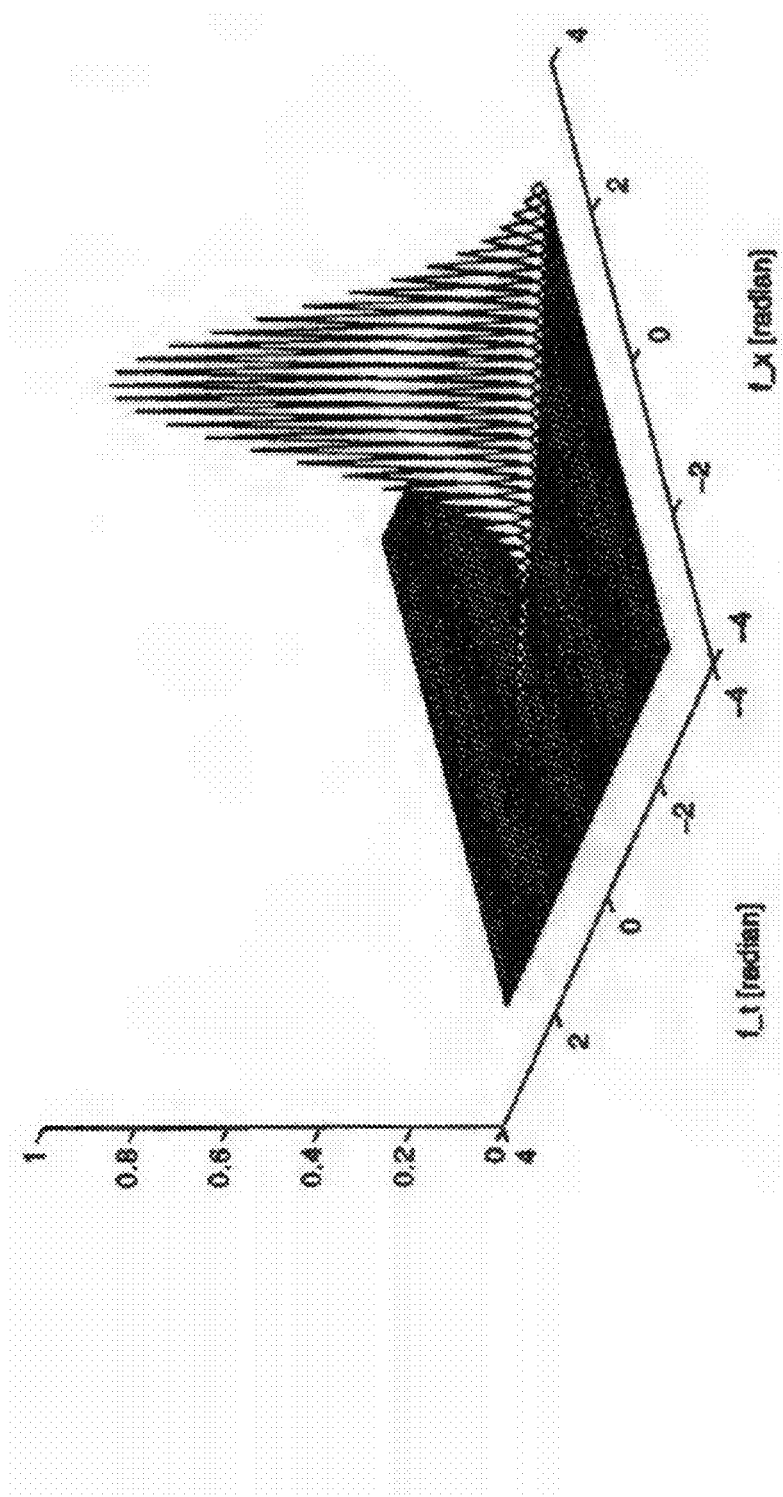
FIG. 14 shows a velocity plane in the Fourier domain (Morlet wavelet), in accordance with some embodiments.

Any wavelet $\hat{\Psi}$ that fulfills the condition of square-integrability will be a qualified analyzing tool for motion analysis. The Morlet wavelet was used for the results derived in FIG. 14. The design of the optimal analyzing wavelet depends on the problem to be solved.

Figure 15:
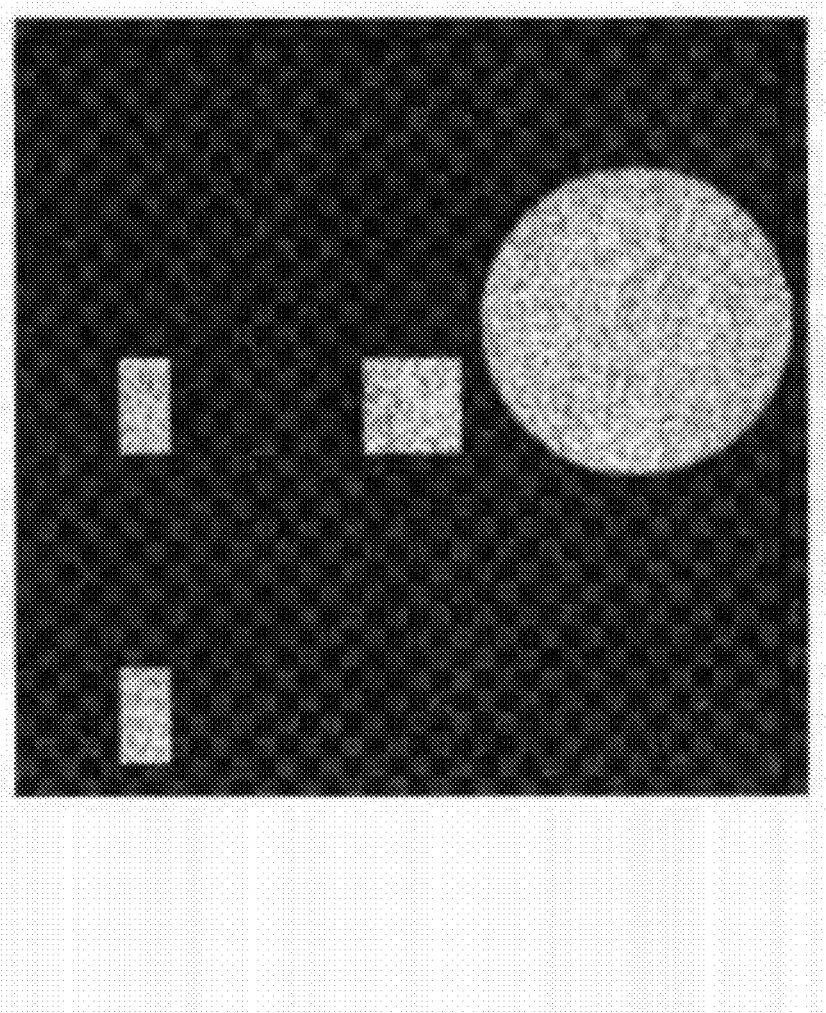
FIG. 15 shows synthetized video sequence, in accordance with some embodiments.
Figure 16:
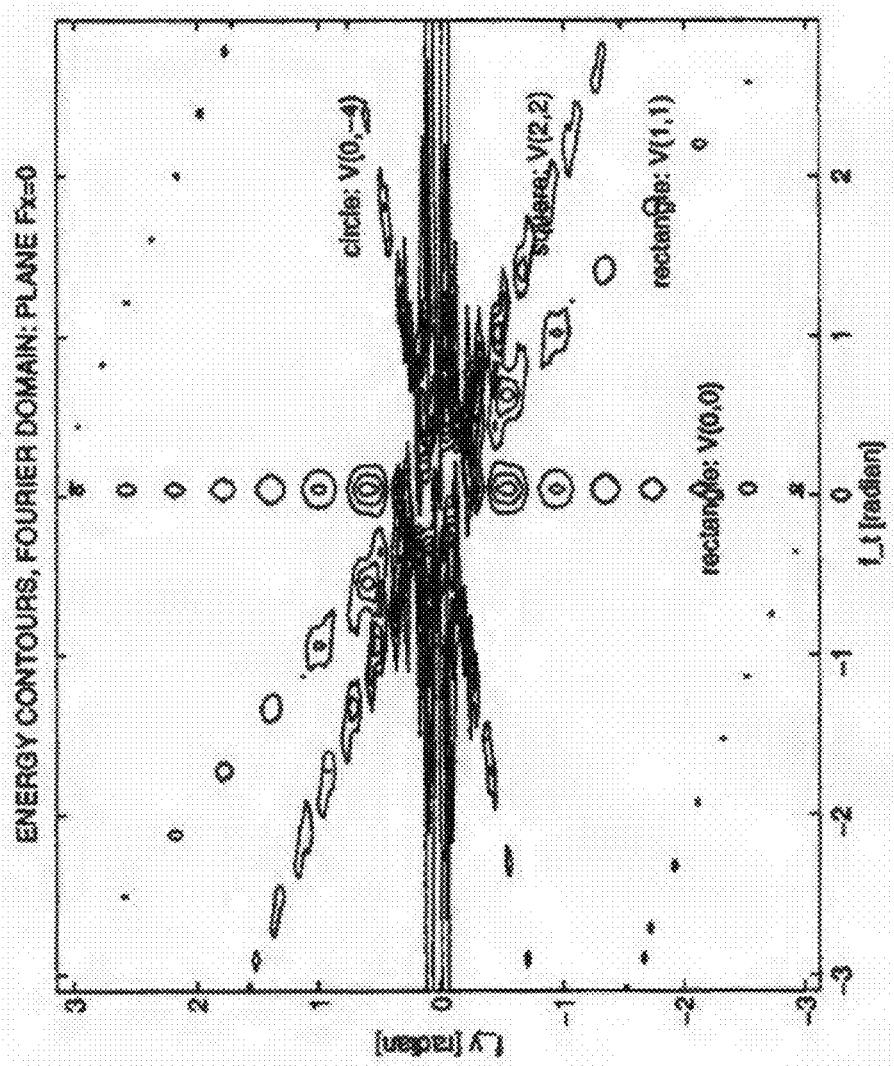
FIG. 16 shows a velocity plane in the Fourier domain (spatial frequencies), in accordance with some embodiments.

To conclude, let us mention that an object which is put in motion with a velocity v preserves the spatial frequencies in the Fourier domain. The spatial frequencies are shifted on a span given by the inner product (−v·k) along the temporal frequencies as presented in FIG. 16. Further, FIG. 15 shows synthetized video sequence.

This defines a velocity plane in the Fourier domain which is orthogonal to vector (v, 1), a plane of equation v·k+ω=0. The spectrum of all the objects moving at velocity v will be concentrated along that plane inside some ellipsoid that accounts for some time-frequency Fourier uncertainty.

The inverse problem is the mathematical process of collecting a set of observations from a sensor array to calculate the causes that produced them. Inverse problems are important mathematical processes since they enable to compute the values of parameters that are not directly observable. The causal parameters can only be computed if an accurate model of the cause that produced them is known. For example, if the causes are produced by waves, the model of wave propagation is a model that is known from the wave propagation equations and can lead to ultimately precise computations. The inverse problem technique enables the estimation and the analysis of structures that are located beyond the sensor network, and therefore, that are not accessible. If the model is well-posed, it is possible to infer the exact parameter values. But the inverse model can be ill-conditioned depending on the positions of the sensors. A well-posed problem must satisfy three conditions: existence, uniqueness and stability of the solution. Depending on the number of sensors and their locations in the field, the second and third conditions may fail for some configurations.

Some well-known examples can be mentioned here. It is possible to picture the internal structure of the Earth by analyzing seismic waves captured from a sensor network located at the surface of the Earth. Astronomers are picturing the internal structure of the Sun by recording the vibrations of the surface of the Sun which are the results of shock waves that propagate inside. Astronomers are recording the variations in the cosmic microwave background to analyze the acoustic waves that were propagating in the dense cloud of electrons and photons that existed after the Big Bang. The cloud was so dense that it prohibited the light to escape setting a barrier that limits our possibility to capture events that took place closer to the Big Bang and before that cloud dispersed. Solving this inverse problem with the model of the sonic shock waves that were propagating inside the cloud enables astronomers to collect explosion information that is closer to the Big Bang and is hidden by the cloud.

The inverse problem algorithm which is implemented in the expert system has as purpose to compute the best model parameters g* that fit to the data d collected by the sensors. The purpose would be to find an inverse model operator Π such that, at least approximately, the operator Π matches exactly the captured data d for the best model parameters g*. That is:

$$d = \Pi(g^*) \quad (15)$$

In the context of the motion estimation, such an operator Π does not exist explicitly as described in Equation 15, and therefore, cannot be directly inverted to derive the best model parameters g*. Since the operator Π cannot be directly inverted, an optimization method has to be used to solve the inverse problem. An objective function is therefore defined to perform this optimization that will solve the inverse problem. The objective function is a functional that measures how close the data predicted from the model fits the observed data. In cases where perfect data are collected without noise and where the appropriate physics of the phenomena taking place is implemented in the model, the recovered data should fit the observed data perfectly. A standard objective function, p, is usually of the form:

$$\phi = \|d - \Pi(g)\|_2^2 \tag{16}$$

meaning that the optimum is computed with the $L^2$-norm or the Euclidean distance of the misfit between the observed data d and the predicted data from the potential model $\Pi(g)$. The optimization of the objective function (i.e. solve the inverse problem) requires computing the gradient of the objective function in the parameter space. The gradient of the objective function is:

$$\nabla_m \phi = 0 \tag{17}$$

The optimization algorithm implemented in this system will take another form and lead to a gradient ascent algorithm for the reason that follows. Euclidean distance is the sum of squared differences, correlation is basically the average product. There is further a basic relationship between the Euclidean distance and correlation. Let us express the correlation between two vectors x and y. An elementary computation shows that if x and y are both normalized, they will each have a mean of 0 and a standard deviation of 1, and therefore, the correlation denoted by r(., .) reduces to:

$$r(x, y) = \frac{1}{n} \sum_i^n x_i y_i \tag{18}$$

On the other end, if we expand the formula for the Euclidean distance denoted by d(., .), we obtain:

$$d(x, y) = \sqrt{\sum_i^n (x_i - y_i)^2} = \sqrt{\sum_i^n x_i^2 + \sum_i^n y_i^2 - 2\sum_i^n x_i y_i} \tag{19}$$

But if x and y are both normalized, the sums $\Sigma_i^n x_i^2$ and $\Sigma_i^n y_i^2$ are both equal to n and the product $\Sigma_i^n x_i y_i$ remains as the only non-constant term, a formalism which connects to the reduced formula for the correlation coefficient. In the case of normalized data, the relation between the correlation coefficient r and the distance d reduces to:

$$r(x, y) = 1 - \frac{d^2(x, y)}{2n} \tag{20}$$

therefore, minimizing the Euclidean distance corresponds to maximizing the correlation coefficient with an ascending gradient algorithm. The maximum correlation technique is known in signal filtering as match filter. The correlation function used in this algorithm is the functional that computes the inner product between the captured signal S and the analyzing wavelets. The analyzing tools are the wavelet functions $\Psi$ designed in the Hilbert space $L^2$ ($R^n \times R$, $d^n x dt$) as admissible representations of the Galilei group. Eventually, the algorithm implements an objective function, $\varphi$, which is expressed in the space-time domain as:

$$\phi(b,\tau;v;a,r) = |\langle \Psi_{b,\tau;v;a,r} | S \rangle|^2 \tag{21}$$

where the maximum is computed with the $L^2$-norm in the functional space of the motion parameters. The algorithm implements a gradient ascent to derive the best matching parameters (b*, τ*; v*; a*, r*) as:

$$(b^*,\tau^*;v^*;a^*,r^*) = \arg\max_{(b,\tau;v;a,r) \in G} \phi(b,\tau;v;a,r) \tag{22}$$

The evolution of a moving pattern defines a trajectory. Following Lagrangian mechanics, the trajectory is derived by solving Euler-Lagrange equation. The Euler-Lagrange equation is a differential equation involving the functions $b(\tau)$ and its derivative $\dot{b}(\tau)$ of the real argument τ referring to the spatial position and the velocity both functions of the time variable τ. The Euler-Lagrange equation corresponds to a stationary point of a functional, called the action. This functional is defined as a time integral of a Lagrangian function L:

$$\Theta(b) = \int_a^b L[\tau, b(\tau), \dot{b}(\tau)] d\tau \tag{23}$$

The action is the integral of the Lagrangian from time $t_1 = a$ to time $t_2 = b$ that generates a real number. The stationary point is derived from the first variation and reads as:

$$\int_a^b \delta L[\tau, b(\tau), \dot{b}(\tau)] d\tau \tag{24}$$

which is also known as Hamilton's principle or principle of the least action. At the stationary point, the Euler-Lagrange equation reads:

$$\frac{\partial L}{\partial b_i}[\tau, b(\tau), \dot{b}(\tau)] - \frac{d}{d\tau} \frac{\partial L}{\partial \dot{b}_i}[\tau, b(\tau), \dot{b}(\tau)] = 0 \tag{25}$$

for $i = 1, \ldots, n$ where L is the Lagrangian and $\Theta(b)$ is the trajectory defined by the extremum. The Euler-Lagrange equation is a necessary, but not sufficient, condition for an extremum of $\Theta(b)$. The functional $\Theta(b)$ has a minimum or a maximum at b=b* if its first variation $\delta\Theta(b)=0$ at b=b* and its second variation $\delta^2\Theta(b)$ is strongly positive or negative at b=b*. Trajectories are described by the solutions of the Euler-Lagrange equation for the action of the system. The Lagrangian approach substitutes the concept of mobiles accelerating in response to applied forces to mobile moving on the path of a stationary action. This method of representing motion and trajectories is more fundamental and enables to connect with the wavelet representation of motion.

To proceed at this stage, the expert system needs to implement the Lagrangian function and to define the algorithm to construct the motion trajectories. In this expert system based on using wavelets as analyzing functions and the inner product as analyzing tool, the Lagrangian function is chosen to be the absolute value or modulus of the wavelet transform. The algorithm will compute the extremum in the $L^2$-norm. In this setting, the Lagrangian reads:

$$L[\tau, b(\tau), \dot{b}(\tau)|a, r] = |\hat{\Psi}_{(b,\tau;v|a,r)} \hat{S}|^2 \text{ with } \dot{b}(\tau) = v \tag{26}$$

The construction of the motion trajectories is implemented with the use of dynamic programming theory based on the Bellman recursive equations where the Lagrangian function is destined to be the reward function. For the purpose to proceed to this algorithm of optimization, some rearrangements of the content of equation 26 need to be made as follows. The kinematical parameters, the analyzing function and the collected data need all to be redefined to fit to the concepts of action and state as rooted in dynamic programming theory. The optimal $\hat{\Psi}$ will derive the action to be taken at time τ, $\alpha_\tau$ to build the next piece of trajectory $\Theta(b)$ from the information of position (b, τ) and velocity v. The signal S stands for the signals sampled at time τ that produces a set of data collected at time τ. The set of data collected at time τ will represent the state $s_\tau$ of the system at time τ. The dynamic programming algorithm is a dynamic decision problem that eventually extends up to an infinite horizon. The sequence of all decision is called the policy.

Let us define the state of the system at time τ to be $s_\tau$. A decision sequence will start at time τ=0 from a given initial state to be $s_0$. At any time τ, the set of possible actions depends on the current state $s_\tau$. The action to be taken $\alpha_\tau$ represents the control variables. The control variables are the variables to be chosen at any given time τ. The potential number of actions to be taken belongs to a set Γ such that $\alpha t \in \Gamma(s_\tau)$. The state changes from $s_\tau$ to a new state at time τ+1 denoted $s_{\tau+1}$ where $s_{\tau+1}=T(s_\tau, \alpha_\tau)$ when action $\alpha_\tau$ is taken. The resulting reward function from taking action ατ in state $s_{\tau+1}$ is $L(s_\tau, \alpha_\tau)$. Under these assumptions, an infinite-horizon dynamic problem produces a total value function given by:

$$V^*(s_0) = \max_{\{\alpha_\tau\}_{\tau=0}^\infty} \sum_{\tau=0}^\infty \gamma^\tau L(s_\tau, \alpha_\tau) \quad \text{with: } 0 \le \gamma \le 1 \quad (27)$$

where:
1. V is the recursive value function.
2. γ is the survival likelihood of the trajectory.
3. $\alpha_\tau$ is the action taken at time τ to build the trajectory Θ(b).
4. $s_\tau$ is the state of the system at time τ, corresponding to the collected data.

The dynamic programming method breaks the decision-making problem into smaller sub-problems as a result of Richard Bellman's principle of optimality which was stated as follows. An optimal policy has the property that whatever the initial state and initial decision are, the remaining decisions must constitute an optimal policy with regard to the state resulting from the first decision. As stated in the principle of optimality, the first decision is considered separately, setting aside all future decisions. Therefore, starting at time τ=0, the best value V-function, V*, reads:

$$V^*(s_0) = \max_{\alpha_0} E_{s_1} [L(s_0, \alpha_0, s_1) + \gamma V^*(s_1) | s_0] \quad (28)$$

subject to the constraints: $\alpha_0 \in \Gamma(s_0)$, $s_1 = T(s_0, \alpha_0)$ where $E_x$ stands for the expected value or the mathematical expectation of the random variable x which is by definition the integral (or the sum in the discrete case) of the random variable with respect to its probability measure.

The entire dynamic problem can be rewritten in a recursive form involving the value function. Proceeding recursively step by step, we derive the equation, known as the Bellman's equation, expressing the best value V-function, V*, reads at time τ as:

$$V^*(s_\tau) = \max_{\alpha_\tau} E_{s_{\tau+1}} [L(s_\tau, \alpha_\tau, s_{\tau+1}) + \gamma V^*(s_{\tau+1}) | s_\tau] \quad (29)$$

subject to the constraints: $\alpha \tau \in \Gamma(s_\tau)$, $s_\tau+1 = T(s_\tau, \alpha_\tau)$
where:
1. V* corresponds to the best value function.
2. $s_{tau}$ is the current state and $s_{\tau+1}$ is the future state.

3. T is the system transformation that assigns an existing new state $s_{\tau+1}$ at time τ+1 from a state $s_\tau$ and an action $a_\tau$ taken at time τ.
4. $\Gamma(s_\tau)$ is the set of all possible actions, $\alpha_\tau$, that can be taken from the state sτ at time τ.

As experienced in all deep learning applications on neural network, it is almost impossible to correctly guess the best choice of the weights or hyper-parameters to be introduced in the neural network at the very first time. Therefore, applied deep learning is a very iterative process that requires to go around this cycle many times to hopefully find a good choice of network for the application. The data available from simulations and field experiments will be split in terms of a training set, a development or cross-validation set and test sets. The work flow is to keep on training algorithms on the training set, to use the hold-out cross-validation set to see which of many different models performs best on this set. And after having performed this cycle enough times to converge, a finalized best model of the neural network is reached that requires evaluation. The best model is evaluated on the test set in order to get an unbiased estimate of how well the algorithm is performing. In the modern era of big data, it is a common practice to select total set that may vary from 100,000 to one million examples in total, then the trend is to have development test and a test set of one (1) percent of the total set. The learning process will be performed in several steps as follow:
1. The acquisition of the topography of the field of interest which is a three-dimensional representation of the field entered in the computer memory.
2. The localization of the motion sensors in the field which can be achieved in two ways:
   2.1. Rationally by measuring and recording the exact positions of the motion sensors in the field at the time of their installation.
   2.2. Experimentally by passing a laser or light beam along the surface of the field and detecting and recording from the sensor network the information of the position in the field that produces the maximum matching signal in the sensor.
3. The calibration of the system for the kinematical parameters which is performed in two ways:
   3.1 Experimentally by a field training. Data are collected by the sensor network by moving patterns of interest of different size or scale, orientation and velocity with reference to floor position markers. Different sources of light shall be experimented with different position and luminosity. The system will establish the direct correlation between the pattern position, orientation and movement and the corresponding sensor detection.
   3.2. Rationally by building a 3D+T simulation on computer. The system will implement and assemble the following pieces:
      3.2.1. The three-dimensional field topography as acquired as described in item #1.
      3.2.2. The sensor locations as determined as in item #2.
      3.2.3. The physical sensor characteristic of capturing and transducing waves in information and data.

The simulation will run and add without restraint any made-up moving patterns with different known size, orientation and velocity and monitoring the sources of light in term of their position and luminosity. This procedure will not only train the deep learning neural net but also set up the expert system at an accurate running level.

Comparisons shall be established between the experimental results obtained in item #3.1. and the simulation results obtained in item #3.2. to adjust and/or correct the simulation model and the expert system until proper correspondence is reached. Proper correspondence shall be specified, but depends and is limited by the level of accuracy that is maximally achievable by the implementation of the system.

4.1. The self-training of the neural net against the built-up expert system which is calibrated to generate moving patterns configured to the monitored field, to deduce the signals to be collected by the sensor network in the field setting.

The presence of an expert system that can operate a training in a realistic manner enables the machine to work against itself and reach a tremendously large training set.

A deep learning process will also perform an inverse problem from the motion sensor network and the video signals captured from multiple cameras, but in this case, it is learned by training, re-training and updates. At this stage the neural network algorithm will detect the moving patterns, classify them according to scale, shapes, orientation velocity, and position, pick up the pattern of interest and perform recognition following a pre-established database. The deep learning process will also detect the occurrence of abnormalities, detect and predict incidents and accidents. All data will be available on computers through a menu.

To reach a formulation on the Q-learning system computing the kinematical parameters and deriving the trajectories, we need to introduce the action-value function or Q-function which is a function not just conditioned to the current state $s_\tau$ but also to the action $\alpha_{\tau+1}$ that has been taken. The way to relate the value V-function with the Q-function is as follows:

$$V(s_\tau) = \max_{\alpha_{\tau+1}} Q(s_\tau, \alpha_{\tau+1}) \tag{30}$$

After taking their best value as V* and Q* and introducing them in Bellman's equation #29, the result reads:

$$V^*(s_\tau) = \max_{\alpha_\tau} E_{s_{\tau+1}} \left[ L(s_\tau, \alpha_\tau, s_{\tau+1}) + \gamma \max_{\alpha_{\tau+1}} Q^*(s_{\tau+1}, \alpha_{\tau+1}) \middle| s_\tau \right] \tag{31}$$

But, by the definition given in Equation 30, the expected value on which the $\max_{\alpha\tau}$ is taken in Equation 31 is nothing but the best Q-function, $Q^*(s_\tau, \alpha_\tau)$, which read:

$$Q^*(s_\tau, \alpha_\tau) = E_{s_{\tau+1}} \left[ L(s_\tau, \alpha_\tau, s_{\tau+1}) + \gamma \max_{\alpha_{\tau+1}} Q^*(s_{\tau+1}, \alpha_{\tau+1}) \middle| s_\tau, \alpha_\tau \right] \tag{32}$$

The result is similar to Bellman's equation but instead of considering a state, we consider the value of state coupled with an action. The selected action is normally given by the best action as:

$$\alpha_\tau^* = \arg\max_{\alpha_\tau} Q(s_\tau, \alpha_\tau) \in \Gamma(s_\tau) \tag{33}$$

meaning to proceed according to the following steps. From a particular situation of the system at state sτ, the process successively optimizes the Q-function over all possible actions, chooses the best action ᾱτ, applies the best action, reads the resulting state $s_{\tau+1}$, captures the expected return, and finds the maximum expected reward.

At this stage, more freedom of choice is provided to humans supervising the system as a result of the existence of an expert system. The adaptive dual control enables to take other decisions in relation with the environment. The action can be taken in different ways as follows:

1. The dual control first differentiates the options into two modes, each of which the supervisor can choose. First, the choices are between:

1.1. Controlling in situations or environments that are predictable, and, 1.2. Learning in situations or environments that are unpredictable.

Second, in some circumstances of interest, a third choice is given by:

2. Locking the control on a pattern of interest.

A schematic diagram of the adaptive dual control is presented in FIG. 17. The equivalence of on adaptive dual control and an artificial intelligence based on an expert system and a Q-learning system is presented in FIG. 18.

In a predictable environment where the statistical models are unchanged and correspond to the last training update, the action to be taken can follow and rely on the neural network. This approach is the empirical way of controlling based on experience which provides fast results. This control can be compared to situations where the brain is taking decision from learned and preprogrammed unconscious sets of actions. People once trained to bike in young age have never to learn to bike again.

In situations where the statistical models of the environment may have or have changed, the environment becomes unpredictable, exercising caution and learning becomes the prevailing rules. Since the expert system is permanently supervising and checking the deep learning system, this situation happens for example when the expert system finds a significant discrepancy between its computation result and those derived from the neural net system. The determination of the optimal action may be changed by the supervisor in two main ways as follows:

1. Follow the action computed from the expert system according to the acquired topography of the field.

2. Explore the new environment and learn. During learning periods, actions can be taken just to explore the environment, not to maximize the Q-function necessarily. There are different techniques that allow the system to decide which action to take to explore the environment. One way to progress is to move with probability $\in$ to $\alpha^* = \arg\max_\alpha Q(s,\alpha')$, and with probability (1−∈), to make a draw out of a uniform probability distribution.

Following the accurate model provided by the expert system is the rational way of controlling based on a model. The model is based on theoretical mechanics and waves propagation and takes into account the motion sensors positions and detection characteristics. This process is slower than the empirical process since it requires more computer resources. This control can be compared to situations where the brain is taking decision from computing conscious sets of actions.

The locked control corresponds to a possibility given to the supervisor to freeze on the system on a given target of interest. This option is especially useful and efficient where active motion estimation is performed through precise measurements using ultrasonic, microwave or laser systems and can be entered to take selected actions. The tools of active motion measurement can also be embarked with a video camera on a drone or a robot to supply detailed analysis leading to some capture or to perform more complex tasks or interventions.

Neuro-dynamic programing is the process that implements dynamic programming with a neural network. Neuro-dynamic programing works on the basis of Q-learning. Q-learning is a model-free reinforcement learning technique where an action-value function, denoted by Q(s, α), is learned from a training stage. Q-learning ultimately provides the expected utility of taking a given action α in a given state s, thereafter following the optimal policy. A policy is a rule that the agent follows by selecting actions, given a current state. When the action-value function has been learned, the optimal policy can be constructed by simply selecting the action with the highest value in each state. One of the strengths of Q-learning is that it is able to compare the expected utility of the available actions without requiring a model of the environment as long as the environment is predictable. Q-learning can handle any problems made of stochastic transitions and rewards.

The algorithm has a function that calculates the quality of a state-action combination as follows $$Q:(s \times \alpha) \to R \quad (34)$$

By performing an action $\alpha \in \Gamma$, the algorithm can move from one state to another state. Executing an action in a specific state provides with a reward L. The goal of the agent is to maximize the final recursive value function over the entire span or horizon. It reaches this goal by learning which action ατ is optimal for each state $s_\tau$.

Before learning has started, the Q-function is initialized to a possibly arbitrary fixed value. Then, at each time τ the training selects an action at and observes a reward function $L_\tau$ and a new state $s_{\tau+1}$ that may depend on both states $s_{\tau+1}$ and $s_{\tau+1}$ as well as on the selected action $\alpha_\tau$, the Q-function is updated. The core of the algorithm is a simple value iteration update, using the weighted average of the old value and the new information as follows:

$$Q(s_\tau, \alpha_\tau) \leftarrow (1-\beta)Q(s_\tau, \alpha_\tau) + \beta[L(s_\tau, \alpha_\tau, s_{\tau+1}) + \gamma \max_{\alpha_\tau} Q^*(s_{\tau+1}, \alpha_\tau)] \quad (35)$$

where β is the learning rate such that 0<β<1.

The implementation is made by a neuro-dynamic programming algorithm which is an approximation where the Q-learning function represents a neural network. The Q-function will now be parameterized with the kinematical parameters g=(b, τ; v; a, r) and Q becomes a function in the form of $Q(s_\tau, \alpha_\tau; g)$. The Q-functions are implemented as a neural network that takes states and actions as inputs and provides the best action to be performed as optimal output.

As the result of parameterizing Q with the g-parameters and implementing Q-function as a neural network, the computations of $Q(s_\tau, \alpha_\tau; g)$ are approximations of what would be computed with the actual Bellman's recursive algorithm. The neural network implements an approximation of the actual dynamic programming algorithm. Therefore, an error or loss function needs to be computed which measures how far the neural network stands from the actual Bellman's corresponding back-up. Eventually, the loss function L has to be minimized applying a gradient descent algorithm which will derive the optimal parameters.

The algorithm computes the loss function L in the $L^2$-norm as the difference between the target produced by the true Bellman's recursive computation:

$$E_{s_{\tau+1}}[L(s_\tau, a_\tau, s_{\tau+1}) + \gamma \max_{a_{\tau+1}} Q^*(s_{\tau+1}, a_{\tau+1}; g_{i-1})]$$

And the neural network Q(sτ, aτ; gi) as $$\mathcal{L}(g_i) = E_{s_\tau, a_\tau}\left\{\left(E_{s_{\tau+1}}\left[\begin{array}{c} L(s_\tau, a_\tau, s_{\tau+1}) + \\ \gamma \max_{a_{\tau+1}} Q^*(s_{\tau+1}, a_{\tau+1}; g_{i-1}) \end{array}\right] - Q(s_\tau, a_\tau; g_i)\right)^2\right\} \quad (36)$$

Let us remark that the target can only use the g parameters computed from the previous stage i−1 to induce a feedback correcting loop.

Taking the derivative of the loss function and using the chain rule, the result reads in a gradient form as:

$$\nabla_{g_i} \mathcal{L}(g_i) = \quad (37)$$

$$E_{s_\tau, a_\tau}\left\{\left(E_{s_{\tau+1}}\left[L(s_\tau, a_\tau, s_{\tau+1}) + \gamma \max_{a_{\tau+1}} Q^*(s_{\tau+1}, a_{\tau+1}; g_{i-1})\right] - Q(s_\tau, a_\tau; g_i)\right)\nabla_{g_i} Q(s_\tau, a_\tau; g_i)\right\}$$

algorithm is performed to derive the optimal kinematical parameters ĝ and finally and derives the best action to be taken as:

$$\alpha_\tau^* = \arg\max_{\alpha_\tau} Q(s_\tau, \alpha_\tau; g^*) \in \Gamma(s_\tau) \quad (38)$$

To design a reinforcement learning algorithm with a neural network, the action is chosen from the Q-function where the parameter has been optimized, i.e., updated. The algorithm works as follows:

1. Start with a state $s_\tau$.
2. Find the optimal parameters g*.
3. Choose the best action to be taken $\alpha_1$.
4. Observe the environment changing to state $s_{\tau+1}$.
5. Update the optimal parameters ĝ and move back in Item #3.

One of the major point about Q-learning algorithm is that the best action in Item #3 can be chosen as the optimal or can be chosen from a mechanism that is different from the mechanism used to find the best action. Different alternative agents can provide alternative choices for the best action. Action can also be taken from the following sources:

1. The expert system computations.
2. The accurate motion measurements performed by active devices.
3. The strategies to learn and/or explore an unknown environment. A particular strategy has been explained earlier through a way to progress with probability ∈ to $\alpha^* = \arg\max_\alpha Q(s, \alpha')$, and, to make a draw out of a uniform probability distribution with probability (1−∈). The overall strategy aims at learning Q, therefore, at taking actions that explore ranges where Q is not well-known.

In the matrix formulation obtained to describe the transformations induced by the Galilei group, the mathematical formulation issued from quantum mechanics still holds for any pair of non-commuting operators. Non-commuting operators represent observables which are subject to similar uncertainty limits. An eigenstate of an observable represents the state of the analyzing wavelet function for a certain parameter measurement value (the eigenvalue). For example, if a measurement of an observable A is performed, then the system is in a particular eigenstate $\hat{\Psi}$ of that observable. However, the particular eigenstate of the observable A needs not be an eigenstate of another observable B. Then the observable B does not have a unique associated parameter measurement for the observable A, as the system is not in an eigenstate of that observable B.

When a state is measured, it is projected onto an eigenstate in the basis of the relevant observable. For example, if an object temporal position τ is measured, then the state amounts to a temporal position eigenstate. This means that the state is not a velocity v eigenstate, and it can but rather be represented as a sum of multiple velocity basis eigenstates. In other words, the velocity must be less precise. This precision may be quantified by the use of their standard deviations:

$$\sigma_\tau = \sqrt{E(\tau^2) - E(\tau)^2} \quad (39)$$

$$\sigma_v = \sqrt{E(v^2) - E(v)^2} \quad (40)$$

where E(.) stands for the expected value. As in the wave mechanics interpretation provided here above, a tradeoff needs to exist between precise measurements to be made on the respective parameters at the same time. The result is ruled by an uncertainty principle.

For a pair of operators A and B, we can express their commutator [., .] as defined by:

$$[A,B] = AB - BA \quad (41)$$

In this notation, the Robertson uncertainty relation keeps a form very close to the Heisenberg original inequality:

$$\sigma_A \sigma_B \geq \tfrac{1}{2} |E([A,B])| \quad (42)$$

This uncertainty relation combines two kinds of errors as follows:
1. The statistical error which is the inaccuracy of a measurement of an observable A, and,
2. The systematic error component which is the disturbance produced on a subsequent measurement of the variable B by the former measurement of A.

If this uncertainty relation is applied to the non-commuting operators of temporal position and velocity, it follows from the matrix representation of the Galilei group that:

$$\sigma_v \sigma_\tau \geq \tfrac{1}{2} |E([v\tau' - v'\tau])| \quad (42)$$

which can be simplified without loss of generality by taking the initial time τ=0, and writes as follows:

$$\sigma_v \sigma_\tau \geq \frac{|E([v\tau'])|}{2} \quad (44)$$

Figure 19:
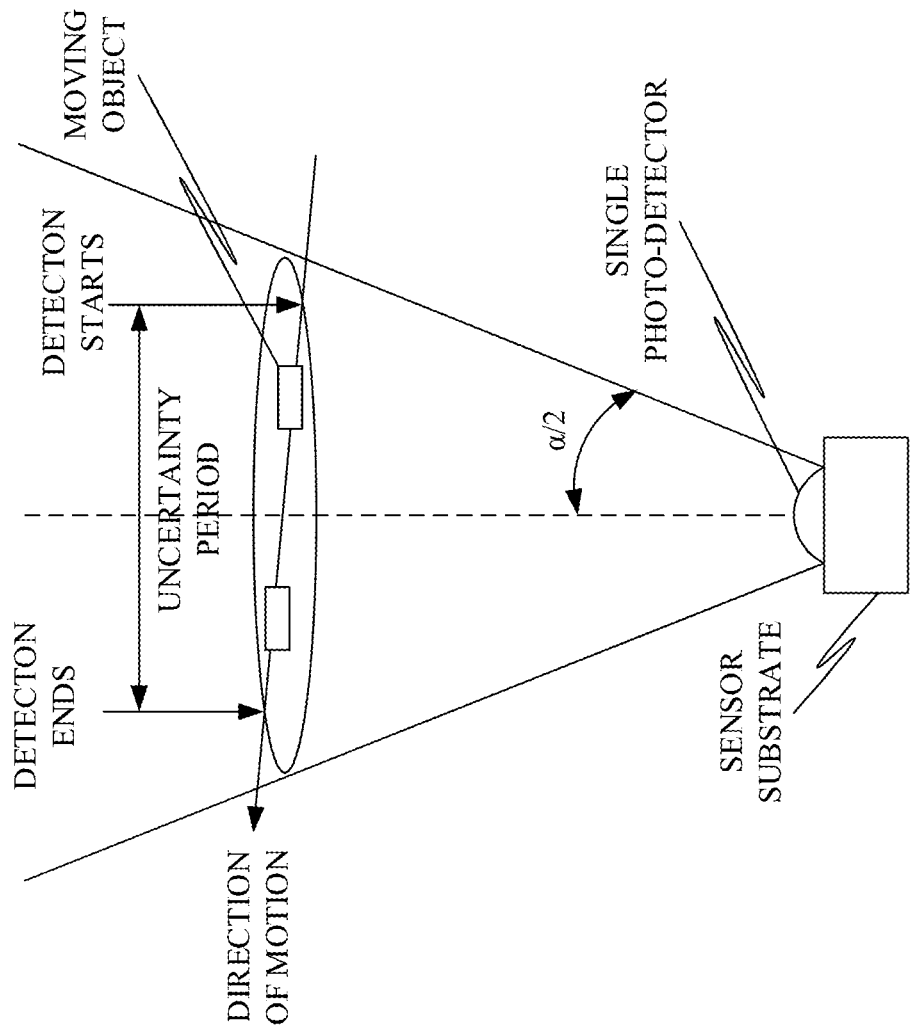
FIG. 19 shows uncertainty principle in the photo-detector field of view, in accordance with some embodiments.

This inequality can be interpreted as the uncertainty created by the aperture cone or the field of view of a single detector, in any plane orthogonal to the principal cone axis as shown in FIG. 19. At any depth, the intersection of the cone and the orthogonal plane is a circle in which an uncertainty is created. This uncertainty situation is created by the fact that the sensor is blind to any variations of motion that are taking place in the cone section. If time is precisely measured, the uncertainty on the velocity corresponds to all the possible velocities that the mobile will take to travel an expected distance equal to half the average length of a cord of the cone section during the precise measure of time. For example, if the intersection of the cone is a circle, if the radius is s, and all cords are uniformly distributed then the average cord length s given by $$E[|v\tau|] = \frac{1}{\pi} \int_0^\pi 2R\sin\frac{\phi}{2} d\phi = \frac{4R}{\pi}.$$

The uncertainty principle certainly matters when dealing with small scale sensors, but not really in the case of the high-resolution images captured by video cameras for computer vision. Let us remark here that a second uncertainty relation exists in the Fourier domain involving the parameters v and k which reads with normalization: $\sigma_v \sigma_k \geq \tfrac{1}{2}$ as it can be observed in FIG. 9.

Figure 13:
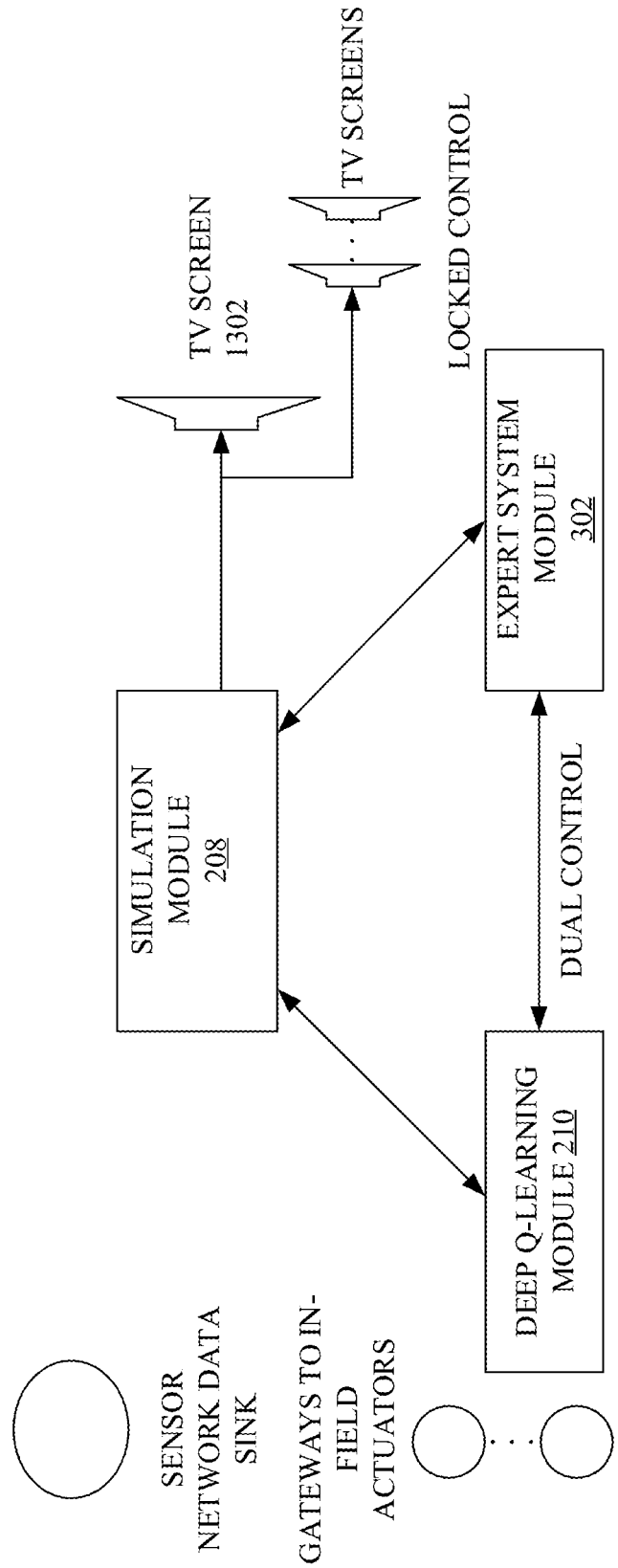
FIG. 13 shows three major components of artificial intelligence software, in accordance with some embodiments.

The Artificial intelligence software of the application layer located in the remote monitoring center will be implemented in local computers or be addressed by connecting to the cloud through the Internet. The artificial intelligence software may be composed of three (3) major components (shown in FIG. 13) which are as follows.
1. The simulation module 208.
2. The deep Q-learning module 210.
3. The expert system module 302.

The deep Q-learning module 210 and expert system module 302 both interact with each other according to a dual control as described earlier. The simulation module 208 is basically connected to one single (huge) screen. To operate the system, the human supervisor just needs to have one computer window to connect directly to a local computer, or through the Internet to a website where the cloud is accessible. The software gives access to a menu leading to different operating modes. Figure X provided here below sketches the interactions between the different parts of this artificial intelligence system.

The Simulation Module 208

The simulation module 208 implements a mapping representation of the three-dimensional field or environment to monitor taking into account the following characteristics.
1. the topography of the field (introduced from available maps and in-site measurements).
2. the light sources (position, intensity and range of irradiance variation, and illumination pattern).
3. the sensors (all kind in the field as included in the monitoring system, position, physical models of capturing and transforming irradiant energy into digital information).

In an initial stage, the simulation module 208 needs to be calibrated from the field in order to set up all the exact values of the set of parameters described in items 1 to 3 here-above: positions and characteristics of all sensors and light sources. The calibration proceeds further by a training where patterns of different scale and orientation are passed through the field and their signatures recorded at all different positions and velocities. This training process will similarly train the deep Q-learning module 210 and calibrate the expert system module 302.

Once correctly calibrated, the simulation module 208 can perform in two following modes:
1. Simulation, meaning to generate/emulate virtual moving objects in the field, computing the data that should be received from the telecommunication network, infer their consequent representations in space and time on the field representation, display on the TV screen 1302 and feed the both the deep Q-learning and Expert system module 302. Simulation representations need to be confronted to the expert system module 302 estimations to allow perfect matching and calibration between simulation module 208 and expert system module 302. The simulation module 208 can then proceed to train the Q-learning system and the dual control first in term of all relevant kinematic parameters and trajectories, and second, in term of prediction of abnormalities, incidents or accidents. Training and retraining occur before operations at the start of the system, and during operations, at the occurrence of changes in the environment and of unpredicted events. In this mode, moving patterns are emulated, representations are created and displayed on the screen in front of the supervisor. The deep Q-learning keeps on training being supervised by the expert system module 302 in a dual control approach. Simulations can be produced either by algorithms that explore randomly and quasi-exhaustively all potential still unforeseen situations or by human operations by enumerating all specific and strategic situations that has a potential to occur.

2. Operation, meaning to represent and map on the field representation all the information received and decoded in real time from the telecommunication network. In this working mode, all decoded information is communicated to both the deep Q-learning and expert system module 302 working in dual control. The real time processing performed by both Q-learning and exert system in dual control will return the proper estimated values of the relevant kinematic parameters, trajectories, and eventually, the term of prediction of abnormalities, incidents or accidents, all of which being display on the TV screen 1302.

The simulation module 208 is permanently connected to a TV screen 1302 which displays in the two modes the field of interest, all detected moving patterns labeled with their specific classification and recognition along with some potential alarm setting.

The simulation module 208 is connected to a data storage which contributes to generate a big data record system including the following 1. All simulations performed algorithmically or humanly for training and updating the system.
2. All information received and decoded in real time from the telecommunication network as resulting from the current surveillance activities.

This big data record will be analyzed as background work on given time spans such as daily, weekly, monthly, yearly to discover new unforeseen pattern situations that may be missing in the initial or updating trainings and help to induce new updates of the system.

The Deep Q-Learning Module 210

The Deep Q-learning module 210 works like the unconscious part of the human brain which, after learning and updating from experiments gained from the environment, analyzes and makes fast recognitions and decisions. This part has the essence of a bottom-up approach, that one of empiricism.

The Deep Q-learning module 210 is trained from both the real field and the calibrated simulation module 208 before the start of operations, and afterwards, at the occurrence of both modifications of the field or unpredicted events. The Deep Q-learning module 210 receives the field information from the simulation module 208 which decodes and locates the information received from the telecommunication network in real time on the three-dimensional topographic representation of the field. The Deep Q-learning module 210 receives information from all connected passive and active motion sensors to perform motion classification, trajectory building, prediction of abnormalities, incidents or accidents. The Deep Q-learning module 210 receives limited stream or motion-related segments of information from video cameras to perform pattern recognition using an established and real time updated data base. All data after analysis are transmitted to the simulation module 208 to label all moving patterns on the screen with the recognized characteristics, signal either unclassified or unrecognized patterns or the potentiality of abnormalities, incidents or accidents.

The Deep Q-learning module 210 is supervised and controlled by the Expert system module 302 through an adaptive dual control principle.

The Expert System Module 302

The expert system module 302 is divided into two parts as follows.

1. A controlling expert system module 302.
2. A big data analytics expert system module 302.

The Controlling Expert system module 302 works like the conscious part of the human brain and makes accurate analysis but at a slower pace than the deep Q-learning. It has the essence of a top-down approach, that one of rationalism. The Controlling Expert system module 302 implements the accurate/true models of mechanics (motion) and physics (sensors) taking into account the field topography. The controlling expert system module 302 analyzes the motion information with a redundant basis of analyzing functions that constitute of a dictionary to decompose the sensed signals into its motion components. This part refers to the digital signal analysis theory here extended to process signals generated from scattered sensor grids capturing wave transformations that occurred in the field due to motion and in the sensor field of view due to the electronics/photonics effects. The Controlling Expert system module 302 can build and then work on an established and updatable data base of analyzing functions roughly working as match filters. The analyzing functions are constructions based on Lie group representations of motion and waves as digitized continuous wavelets (Generalization of the Fourier Transform). The kinematic parameter estimation is performed as filter matching though an inverse problem technique. The analyzing function needs to be calibrated along with the simulation module 208 before the start of the system. Motion trajectory construction is based on resolving an Euler-Lagrange Equation which comes to an algorithm. In this algorithm, each trajectory is the locus that optimizes a Lagrangian function through a dynamic programming algorithm that can be rewritten in a recursive form known as Bellman's equation. The dynamic programming algorithm is deep learning implemented in the Q-Learning system all becoming neurodynamic programming with Q-learning function as state of a neural network with approximations leading to a gradient algorithm. For kinematic parameter estimation as well as trajectory building, the controlling system supervises and validates the outcome of the Deep Q-learning in an adaptive dual control. In predictable situations, the adaptive control regulates and the deep Q-learning outcome is prevailing to display the results in the simulation module 208. In situations that become unpredictable, the expert system module 302 is taking over with the simulation module 208 in order to update and improve the training the deep Q-learning module 210 and alert the human supervisor of the actions to be taken.

The big-data analytics expert system module 302 works on the all the past-accumulated data. Over days, weeks and months, all data produced by the connected sensor network and decoded in the simulation module 208 are recorded and archived which generates a big data system. The big-data analytics system performs predictive analytics which consist of extracting information from the existing big data set in order to determine and characterize specific moving behavior patterns and be able to predict future situations, abnormalities, incidents and accidents and to explore unusual events or situations all with more and more efficiency. The big-data analytics also will produce all forms of customized statistics over day, week, month and year ranges.

The Locked Mode

The locked mode is an additional operative mode of the system where the human supervisor or the artificial intelligent system may focus and freeze on specific moving patterns of interest with the following tools.

1. Add at least one TV screen 1302 which will display the video streams coming from the cameras (one or more) which fields of view cover the pattern of interest. The cameras involved in this tracking will keep on changing automatically according to their respective fields of view and the trajectory taken by the moving pattern of interest in order to trace all the tour and be able to react on the moving pattern at any time or any position of its tour.
2. Add TV screen 1302s for local moving cameras installed on moving robots, drones or human security guards.

Freeze mode is a locked control property that comes as an additional capability to the adaptive dual control performed by the deep Q-learning module 210 and expert system module 302. All data generated by induced freeze mode are recorded for long term on the big data storage.

Further, in the inverse problem, detection and motion analysis may be solved by a dual control process functioning on a deep learning neural network and an expert system. The way a dual control implements an adaptive optimal control 1718 may be pictured in FIG. 17. On situation of interest, an algorithm 1700 may freeze 1706 on specific patterns. Depending on a predictability 1702 or an unpredictability 1704 of the environment, the algorithm 1700 may make decisions based on two or more available chains of command such as regulate 1712, learning 1714, caution 1716.

Further, periods where the environment may be predictable, correspond to situations that have been learned during the training. On predictable situations, the deep learning algorithm (such as the algorithm 1700) may work as a stand-alone process that takes actions that rely to its training, meaning the training originally received at the initiation of the system or the latest training update. During the training periods, the weights or the hyper-parameters of the neural network were computed and adjusted for optimal motion analysis.

Further, on situations where the environment deviates from an acquired statistics and become unpredictable, the deep learning algorithm (such as the algorithm 1700) may take actions that refer to an exact model. The so-called expert system performs the optimal motion analysis but at a lower speed. The deep learning algorithm may need to be retrained or updated to the new environment statistics.

Further, on special situations where the neural network may rely on additional accurate motion measurements made by an active system (like Doppler measurements through ultrasonic, microwave or laser systems), a supervisor may freeze 1706 the control on the measurements performed by the active system. Applications of a locked control may also be implemented as the capture by a robot of a pattern moving in the field.

Further, the Q-learning function of the deep learning algorithm may allow the action to be selected from different sources. In this application, an adaptive process may be implemented and the actions to be taken can be determined following two control patterns which may be a dual control 1710 and a locked control 1708.

The dual control 1710 differentiates between situations that may be predictable to situations that are unpredictable. In a predictable environment where the model statistics are unchanged and correspond to the last training update, the action to be taken may follow and rely on the neural network supervised by the expert system. In situations where the model statistics may have or have changed, the environment becomes unpredictable. Exercising caution and learning become the prevailing rules. The determination of the optimal action to be taken may be changed by the supervisor in three different ways. First, follow the action computed by the expert system. Second, explore the new environment to learn. Third, follow the action computed from another source of measurements.

Further, the locked control 1708 may correspond to a possibility given to the supervisor to freeze 1706 on the system on a given target of interest. Further, latter option may be especially useful and efficient where active motion estimation may be performed through precise measurements using ultrasonic or laser systems and may be entered as selected action.

Figure 18:
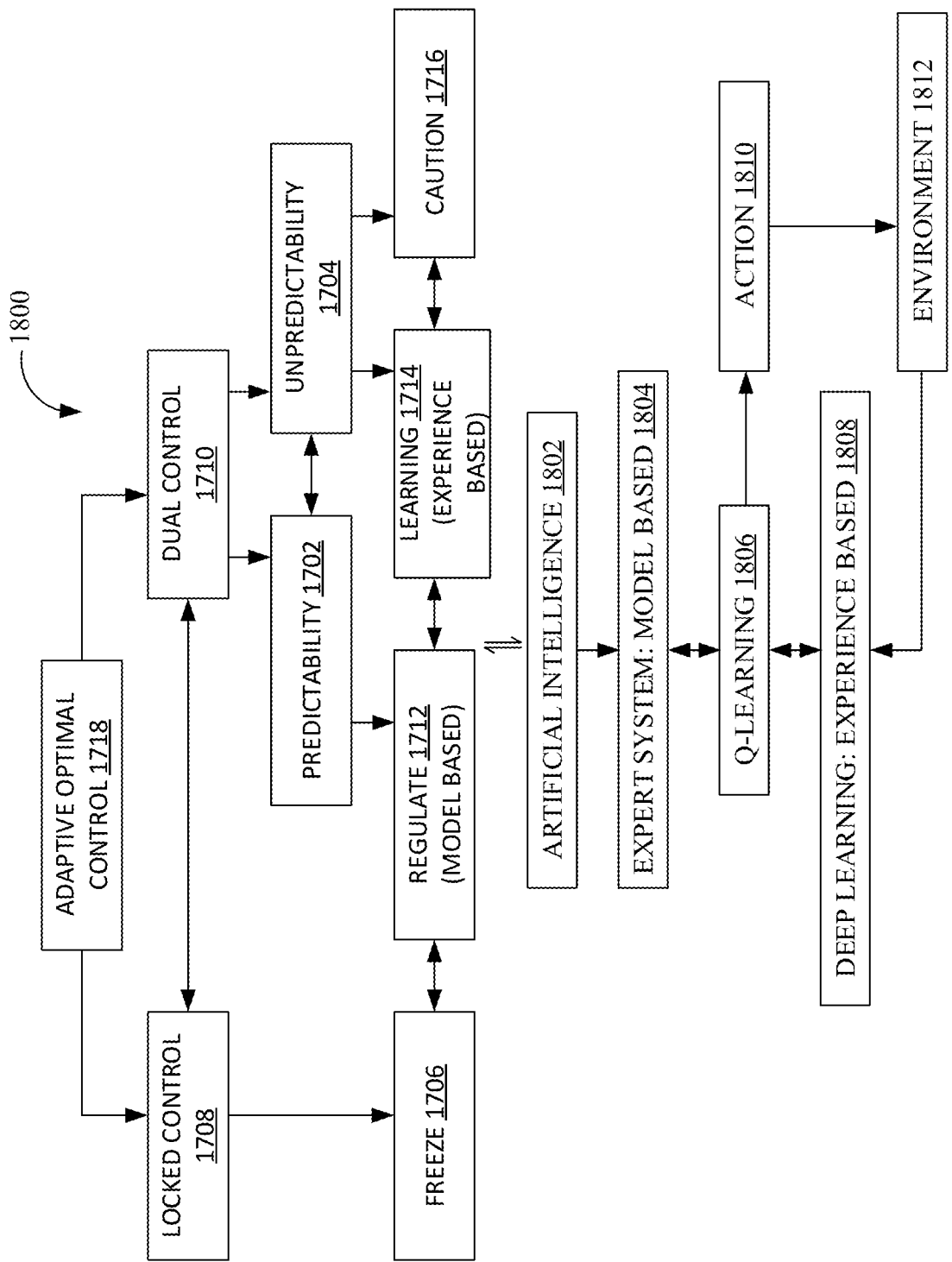
FIG. 18 shows an adaptive dual control in artificial intelligence, in accordance with some embodiments.

The equivalence of on adaptive dual control and an artificial intelligence based on an expert system and a Q-learning system is presented in FIG. 18. As shown, the algorithm may employ artificial intelligence 1802, and model based expert system 1804. Further, Q-learning 1806 may lead to action 1808, which may affect environment 1812, thereby providing a deep learning based experience.

Alternative techniques of motion sensor networks can be implemented with the same A.I. as the one described in the application layer. In those cases, it involves the introduction of one or multiple active sources of waves but would proceed with the same schemes and procedures of telecommunicating and monitoring in the remote center. Two active motion sensor networks are considered here which are namely a network of ultrasonic motion sensors and a network of microwave motion sensors. Both types of sensors are also located at the physical layer of the system in the field like any other motion sensors. Those systems require bi-directional transmissions of information: bottom-up with concentration of sensed motion information towards the remote center and top-down with remote center commands sent to adapt local emission modes.

A network of ultrasonic motion sensors is spread in the field or in some areas of the field. Ultrasonic sensors are attached on surfaces in the same way as the photo-detection-based motion sensors. This network set-up requires to install one or more (a variety of) ultrasounds sources in key locations of the field. The frequency range normally employed in ultrasonic detection is from 100 KHz to 50 MHz. This active band is to be too high for normal human ear which is not able to detect sounds. Normal human ear detection is located in the range 20 Hz to 20 KHz. Ultrasonic motion sensor networks work with having individual sources emitting ultrasonic waves all in synchronism in form of impulses or chirps with programmable frequency, length, interval delays or patterns. Distributed motion sensors sense the reflected waves and compare with their background reference, at least, in term of difference of time, and if more sophisticated, in terms of difference of shape, duration, intensity and frequencies. All relevant motion-differential (or total) information are transmitted through the telecommunication network to the remote monitoring.

The implementation of an inverse problem technique is required to estimate/infer the values of kinematic parameters associated to each moving patterns in terms of position, speed, shape and orientation. Inverse problem technique needs to be implemented in each three parts of the A.I. which are namely the Simulator, the Deep Q-learning System and the Expert System. Each part of the A.I. system is requesting training, calibration and simulations as described. The Deep Q-learning can naturally incorporate the resolution of the inverse problem since both working through gradient algorithm-based estimations.

Ultrasonic motion sensor networks can be deploy as a substitute or in addition to existing photo-electric sensors covering a part or the totality of the field of interest. Ultrasonic motion sensor networks are especially useful in applications where photoelectric sensors cannot work of be deployed as a result of the medium like in water or in smoky environments. The velocity of ultrasounds at a particular time and temperature is constant in a medium.

This system is similar to the way how bats generate from their throats chirps with specific ultrasonic frequencies, shapes, lengths and patterns and measure through their ears the time et frequency shifts induced by the chirp hitting an object. In this application, the ear system is now spread in the field of interest in form of a detecting sensor network.

A network of microwave motion sensors is spread in the field or in some areas of the field. Microwave sensors are attached on surfaces in the same way as the photo-detection-based motion sensors. This network set-up requires to install one or more (a variety of) microwave sources in key locations of the field. Microwave are electro-magnetic waves whose frequency bands range from 0.3 GHz to 300 GHz. Microwave sensors and sources work in whole similarity with their ultrasonic corresponding components. Microwave motion sensor networks work with having individual sources emitting ultrasonic waves either continuously or with synchronism in form of impulses of programmable frequency, length, interval delays or patterns. Distributed motion sensors in the area of reception sense the reflected waves and compare with their background reference, at least, in term of frequency shift (Doppler's effect for speed/velocity estimation) and phase shift for delays, and if more sophisticated, in terms of difference of shape, duration, intensity and frequencies. All relevant motion-differential (or total) information are transmitted through the telecommunication network to the remote monitoring.

The implementation of an inverse problem technique is required to estimate/infer the values of kinematic parameters associated to each moving patterns in terms of position, speed, shape and orientation. Inverse problem technique needs to be implemented in each three parts of the A.I. which are namely the Simulator, the Deep Q-learning System and the Expert System. Each part of the A.I. system is requesting training, calibration and simulations as described. The Deep Q-learning can naturally incorporate the resolution of the inverse problem since both working through gradient algorithm-based estimation. Microwave motion sensor networks can be deployed as a substitute or in addition to existing photo-electric sensors covering a part or the totality of the field of interest.

Unlike other waves, microwave sources may have narrow beam that imparts it with the characteristic features like broad bandwidth and high data transmission. Microwave motion sensor network can be used in harsh environment where heat cycles are not regular and can also penetrate through walls, holes and can be employed to impart coverage across the boundary/closings. The networking approach with the A.I. system would be able to disambiguate false alarm occurrence better than any other systems in place. Special applications are prisons, banks, warehouses, museums and more.

Figure 20:
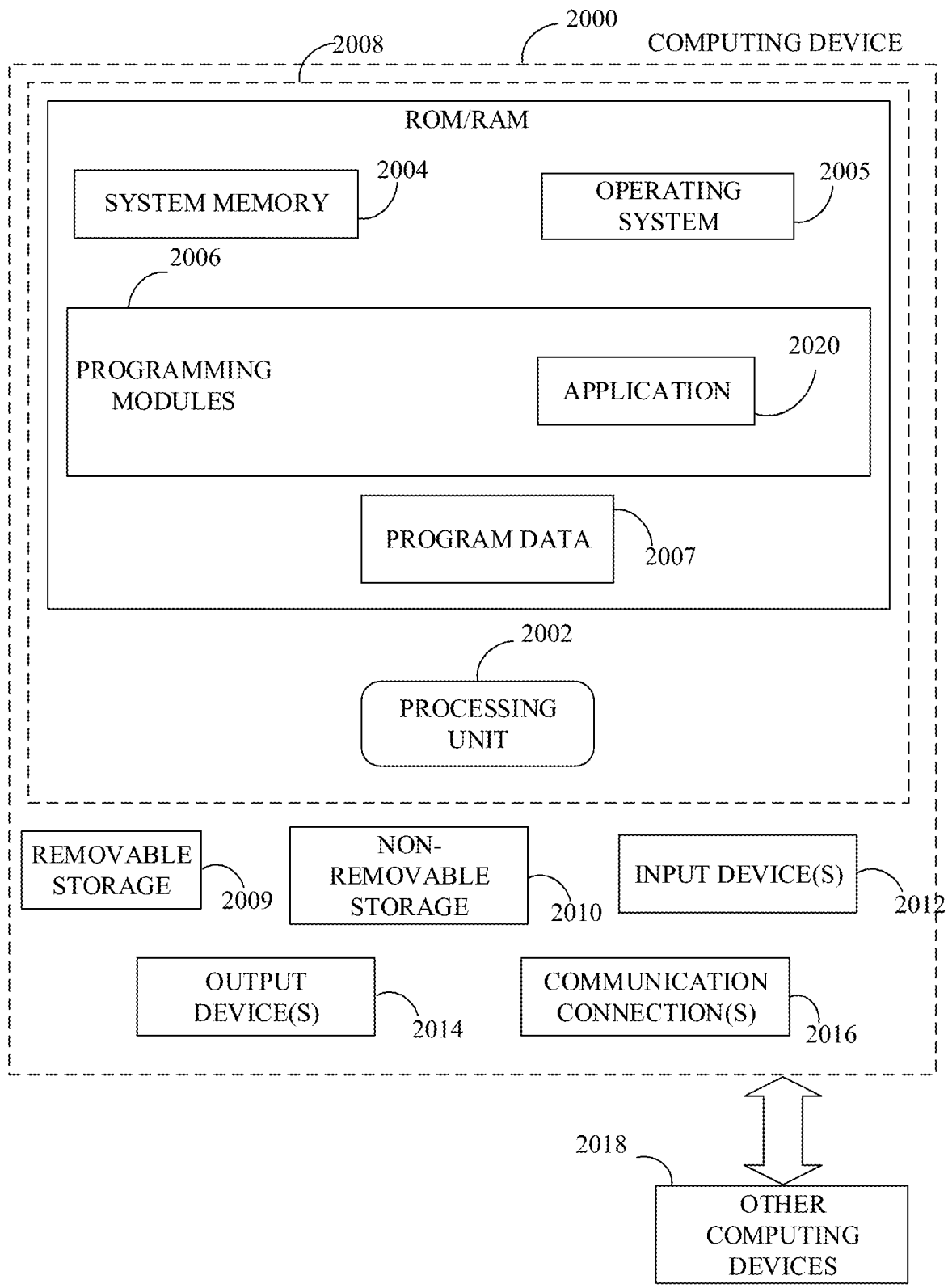
FIG. 20 is a block diagram of a computing device for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g. random-access memory (RAM)), non-volatile (e.g. read-only memory (ROM)), flash memory, or any combination. System memory 2004 may include operating system 2005, one or more programming modules 2006, and may include a program data 2007. Operating system 2005, for example, may be suitable for controlling computing device 2000's operation. In one embodiment, programming modules 2006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and non-volatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet. Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 (e.g., application 2020 such as a media player) may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

I claim:

1. A system for performing motion analysis in a field of interest, the system comprising:
    a plurality of motion sensors configured to be disposed in the field of interest, wherein the plurality of motion sensors is configured to generate a plurality of motion data corresponding to at least one motion of at least one object in the field of interest;
    a communication device configured for receiving configuration data associated with the field of interest from at least one data source;
    a processing device configured for:
    generating a digital model corresponding to the field of interest based on the configuration data using a simulation module;
    generating at least one of a plurality of motion signatures corresponding to a plurality of predetermined motions and a plurality of object signatures corresponding to a plurality of predetermined objects based on the digital model using the simulation module;
    performing training of a deep Q-learning module based on at least one of the plurality of motion signatures and the plurality of object signatures;
    performing a first analysis of the plurality of motion data based on the deep Q-learning module; and generating at least one trajectory data corresponding to at least one trajectory associated with the at least one object based on the first analysis using the deep Q-learning module; and a storage device configured for storing the digital model and at least one of the plurality of motion signatures and the plurality of object signatures;

performing a second analysis of the plurality of motion data based on an expert system module, wherein the generating of the at least one trajectory data is based further on the second analysis;

wherein performing the second analysis comprises:

generating Galilei wavelets based on a plurality of kinematic parameters, wherein the Galilei wavelets are group representations computed from extended Galilei groups, wherein the plurality of kinematic parameters is computed as spatio-temporal functions digitized in the space of the plurality of motion data, wherein the Galilei wavelets facilitate the analysis of the spatio-temporal functions transformed by motion; and estimating at least one kinematic parameter based on the Galilei wavelets, wherein the estimating is performed using an inverse problem technique based on a gradient algorithm with at least one objective function whose computation is based on the digitized Galilei wavelet transform, wherein the estimating of at least one motion trajectory is further performed by dynamic programming using Bellman's recursive techniques, wherein a cost function is optimized using at least one Lagrangian function whose computation is based on the digitized Galilei wavelet transform.

2. The system of claim 1, wherein the processing device is configured for performing predictive analytics based on historical data associated with motion analysis using the expert system module, wherein the generating of the at least one trajectory data is further based on the predictive analytics.

3. The system of claim 1, wherein the performing of the second analysis of the plurality of motion data is based on a physics model and a field of interest model.

4. The system of claim 1, wherein the expert system module supervises and validates an output of the deep Q-learning module based on an adaptive dual control, wherein in an unpredictable scenario, the expert system module performs at least one of training and updating of the deep Q-learning module based on the second analysis.

5. The system of claim 1, wherein configuration data comprises at least one of at least one motion sensor characteristic, at least one object characteristic, at least one light source characteristic, at least one active source characteristic, at least one gateway characteristic and at least one field characteristic.

6. The system of claim 1, wherein the digital model comprises a motion sensor model associated with a motion sensor of the plurality of motion sensors, an object model associated with an object of the at least one object, a light source model associated with a light source of the plurality of light sources, an active source model associated with an active source of the plurality of active sources, a video camera model associated with a video camera of the plurality of video cameras, a gateway model associated with a gateway of the at least one gateway, a field of interest model associated with the field of interest and a remote monitoring center model associated with a remote monitoring center.

7. The system of claim 6, wherein the object model comprises a plurality of object models corresponding to a plurality of predetermined objects, wherein a plurality of object signatures corresponds to the plurality of predetermined objects, wherein the plurality of object signatures comprise a plurality of motion sensor data associated with the plurality of motion sensors, wherein the plurality of object models is determined based on at least one of systematically varying the at least one object characteristic and a strategic input received from an input device operated by a human expert.

8. The system of claim 6, wherein the motion of the object model comprises a plurality of predetermined motions, wherein a plurality of motion signatures corresponds to the plurality of predetermined motions, wherein the plurality of motion signatures comprise a plurality of motion sensor data associated with the plurality of motion sensors.

9. The system of claim 6 further comprising a change detection sensor configured to detect a change in the field of interest, wherein the processing device is further configured for triggering training of the deep Q-learning module based on at least one of the change and detection of an unpredictable event associated with the at least one trajectory data.

10. The system of claim 6, wherein the motion sensor model comprises at least one motion sensor characteristic of the motion sensor, wherein the at least one motion sensor characteristic comprises at least one operational characteristic, wherein the at least one operational characteristic comprises a type of the motion sensor, a sensitivity of the motion sensor, a range of detection of the motion sensor, an angle of aperture of the motion sensor, a resolution of the motion sensor, an accuracy of the motion sensor, a precision of the motion sensor, a linearity of the motion sensor and a time response of the motion sensor, wherein the at least one motion sensor characteristic comprises at least one dispositional characteristic, wherein the at least one dispositional characteristic comprises at least one of a position of the motion sensor and an orientation of the motion sensor.

11. The system of claim 6, wherein the light source model comprises at least one light source characteristic of the light source, wherein the at least one light source characteristic comprises at least one of a type of light source, a position of the light source, an orientation of the light source, an intensity of the light source, a duty cycle of the light source, a spectral band of the light source, a thermal spectral band associated with infrared sources, a radiation pattern of the light source and a range of illumination of the light source.

12. The system of claim 1 further comprising:

a plurality of video cameras disposable at a plurality of key locations in the field of interest, wherein each video camera is configured to capture image sequences associated with a portion of the field of interest, wherein at least one video camera is further configured to transmit a part of a corresponding image sequence to a remote monitoring center through at least one gateway; and at least one gateway disposable proximal to the field of interest, wherein the at least one gateway is configured as a two-way interface capable of communicating with the remote monitoring center and the plurality of motion sensors, wherein the remote monitoring center comprises the processing device, wherein the analyzing is further based on the image sequences.

13. The system of claim 1, wherein the processing device is further configured for:

analyzing the at least one trajectory data based on at least one predetermined rule; and identifying at least one event of interest based on the analyzing of the at least one trajectory data.

14. The system of claim 1, wherein performing training of the deep Q-learning module comprises generating the at least one predetermined rule.

15. The system of claim 1, wherein the processing device is further configured for activating at least one tracker based on identifying of the at least one event, wherein the at least one tracker is configured for controlling at least one operational state of the plurality of motion sensors in order to track the at least one object associated with the at least one event of interest.

16. The system of claim 1, wherein the digital model comprises a three-dimensional visual representation of the field of interest, wherein the system further comprises a display device configured for displaying the three-dimensional visual representation.

17. The system of claim 1, wherein the system further comprises a plurality of active sources configured to emit source waves, wherein the plurality of motion sensors is configured to receive reflected waves corresponding to the source waves, wherein the plurality of motion sensors comprises at least one of a plurality of ultrasonic motion sensors and a plurality of microwave motion sensors, wherein the processing device is configured for:

determining at least one characteristic difference between at least one source characteristic associated with the source waves and at least one reflected characteristic associated with the reflected waves; and estimating at least one kinematic parameter associated with the at least one object in the field of interest based on the at least one characteristic difference.

18. The system of claim 17, wherein the communication device is further configured for receiving a plurality of commands from at least one gateway communicatively coupled with the communication device, wherein the plurality of active sources is configured to operate in at least one of a plurality of emission modes based on the plurality of commands, wherein an emission mode of the plurality of emission modes is characterized by at least one of a frequency of emission, a length of emission, a delay interval between consecutive emissions and a pattern of emission.

\* \* \* \* \*